United States Patent
Chen et al.

(10) Patent No.: US 12,557,085 B2
(45) Date of Patent: Feb. 17, 2026

(54) GROUP COMMON DEMODULATION REFERENCE SIGNAL FOR MULTIPLE USER EQUIPMENTS

(71) Applicants: QUALCOMM Incorporated, San Diego, CA (US); Siyi Chen, Beijing (CN); Changlong Xu, Beijing (CN); Jing Sun, San Diego, CA (US); Xiaoxia Zhang, San Diego, CA (US); Hao Xu, Beijing (CN); Rajat Prakash, San Diego, CA (US)

(72) Inventors: Siyi Chen, Beijing (CN); Changlong Xu, Beijing (CN); Jing Sun, San Diego, CA (US); Xiaoxia Zhang, San Diego, CA (US); Hao Xu, Beijing (CN); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 489 days.

(21) Appl. No.: 18/001,407

(22) PCT Filed: Aug. 20, 2020

(86) PCT No.: PCT/CN2020/110184
§ 371 (c)(1),
(2) Date: Dec. 9, 2022

(87) PCT Pub. No.: WO2022/036620
PCT Pub. Date: Feb. 24, 2022

(65) Prior Publication Data
US 2023/0262671 A1 Aug. 17, 2023

(51) Int. Cl.
*H04W 72/0453* (2023.01)
*H04L 1/1607* (2023.01)
(Continued)

(52) U.S. Cl.
CPC ....... *H04W 72/0453* (2013.01); *H04L 1/1664* (2013.01); *H04L 5/0051* (2013.01);
(Continued)

(58) Field of Classification Search
None
See application file for complete search history.

(56) References Cited

U.S. PATENT DOCUMENTS 12,279,276 B2 * 4/2025 Yi .......................... H04W 24/08
2011/0116465 A1 * 5/2011 Miki ................. H04W 72/1215
370/329
(Continued)

FOREIGN PATENT DOCUMENTS

CN 109150441 A 1/2019
CN 109391401 A 2/2019
(Continued)

OTHER PUBLICATIONS

International Search Report and Written Opinion—PCT/CN2020/110184—ISA/EPO—Apr. 29, 2021.
(Continued)

*Primary Examiner* — Otis L Thompson, Jr.
(74) *Attorney, Agent, or Firm* — NORTON ROSE FULBRIGHT US LLP

(57) ABSTRACT

In some implementations, a method of wireless communication includes obtaining, at a user equipment (UE), an allocation of frequency resources for a group common demodulation reference signal (GC-DMRS) associated with a plurality of UEs that include the UE. The method also includes receiving, at the UE from a base station, a frequency domain resource allocation (FDRA) for a physical downlink shared channel (PDSCH) scheduled for transmission to the UE. The method includes receiving, from the base station, the GC-DMRS and the PDSCH. The method
(Continued)

also includes generating a channel estimate based on the GC-DMRS and the allocation of frequency resources to the GC-DMRS. The method further includes demodulating the PDSCH based on the channel estimate. Other aspects and features are also claimed and described.

30 Claims, 13 Drawing Sheets

(51) Int. Cl.
    *H04L 5/00*     (2006.01)
    *H04W 72/1273*     (2023.01)
    *H04W 72/23*     (2023.01)
    *H04W 76/20*     (2018.01)

(52) U.S. Cl.
    CPC ....... *H04W 72/1273* (2013.01); *H04W 72/23* (2023.01); *H04W 76/20* (2018.02)

(56) References Cited

U.S. PATENT DOCUMENTS

| | | | | |
|---|---|---|---|---|
| 2012/0207105 A1* | 8/2012 | Geirhofer | ............ | H04L 5/0032 370/329 |
| 2013/0039291 A1* | 2/2013 | Blankenship | ......... | H04L 5/0094 370/329 |
| 2013/0265955 A1* | 10/2013 | Kim | ...................... | H04L 5/0051 370/329 |
| 2016/0087709 A1* | 3/2016 | Horiuchi | ............... | H04L 1/0001 375/260 |
| 2017/0272141 A1* | 9/2017 | Horiuchi | ............... | H04L 5/0051 |
| 2018/0042003 A1* | 2/2018 | Chen | .................. | H04W 56/001 |
| 2018/0042040 A1* | 2/2018 | Chen | ................. | H04W 72/1263 |
| 2018/0145805 A1* | 5/2018 | Maaref | ................... | H04W 4/80 |
| 2018/0220415 A1* | 8/2018 | Yin | ........................ | H04L 5/0094 |
| 2019/0124631 A1* | 4/2019 | Ren | ...................... | H04L 5/0048 |
| 2019/0200362 A1* | 6/2019 | Won | ...................... | H04L 25/067 |
| 2019/0260542 A1* | 8/2019 | Wu | ........................ | H04L 5/0007 |
| 2019/0281621 A1* | 9/2019 | Noh | ...................... | H04L 5/0094 |
| 2019/0342905 A1* | 11/2019 | Ren | ...................... | H04L 1/0006 |
| 2019/0349158 A1* | 11/2019 | Wang | ................... | H04W 4/027 |
| 2020/0008225 A1* | 1/2020 | Lee | ........................ | H04L 5/0091 |
| 2020/0008228 A1* | 1/2020 | Lee | ........................ | H04L 5/0048 |
| 2020/0187177 A1* | 6/2020 | Lee | .......................... | H04L 1/08 |
| 2020/0235894 A1* | 7/2020 | Takeda | .................. | H04L 5/0041 |
| 2021/0014893 A1* | 1/2021 | Park | ....................... | H04L 5/0092 |
| 2021/0037525 A1* | 2/2021 | Xu | ......................... | H04W 72/02 |
| 2021/0099981 A1* | 4/2021 | Cirik | ...................... | H04W 72/23 |
| 2021/0099991 A1* | 4/2021 | Liu | ........................ | H04W 72/51 |
| 2021/0212072 A1* | 7/2021 | Lee | ....................... | H04W 72/53 |
| 2021/0218515 A1* | 7/2021 | Yi | ......................... | H04W 72/21 |
| 2022/0022238 A1* | 1/2022 | Chen | ................... | H04B 7/0689 |
| 2022/0182204 A1* | 6/2022 | Chen | ................... | H04B 17/345 |
| 2022/0303084 A1* | 9/2022 | Zhang | ................. | H04L 27/2605 |

FOREIGN PATENT DOCUMENTS

| | | |
|---|---|---|
| CN | 110958067 A | 4/2020 |
| WO | WO-2018145019 A1 | 8/2018 |

OTHER PUBLICATIONS

Qualcomm Incorporated: "DL Signals and Channels for NR-U", 3GPP TSG RAN WG1 Meeting #98bis, R1-1911095, Oct. 14, 2019-Oct. 20, 2019, pp. 1-18, Oct. 20, 2019.

* cited by examiner

GROUP COMMON DEMODULATION REFERENCE SIGNAL FOR MULTIPLE USER EQUIPMENTS

CROSS-REFERENCE TO RELATED APPLICATION

This application is a 371 National Stage of PCT Application No. PCT/CN2020/110184, filed on Aug. 20, 2020, and assigned to the assignee hereof. The disclosure of the prior Application is considered part of and is incorporated by reference into this Patent Application.

TECHNICAL FIELD

Aspects of the present disclosure relate generally to wireless communication systems, and more particularly, to transmission of a group common demodulation reference signal (DMRS) to multiple user equipments (UEs). Certain embodiments of the technology discussed below may enable and provide improved channel estimation by UEs.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

In order to enable a UE to perform a channel estimate for use in demodulating a received channel, such as a physical downlink shared channel (PDSCH), a base station may transmit a demodulation reference signal (DMRS) to the UE. The DMRS may be allocated resources, such as frequency resources, located in a fixed position or aligned with a start of data transmission via the PDSCH. A DMRS sequence used by the base station may be resource-specific with respect to a wideband component carrier (CC) from a network perspective. Because the base station transmits a DMRS to a UE for each PDSCH, the DMRS is allocated to the same size resources (e.g., number and size of resource block groups) as the respective PDSCH. Such DMRS resource allocation may arbitrarily limit the effectiveness of channel estimation performed by the UE based on the DMRS.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes obtaining, at a user equipment (UE), an allocation of frequency resources for a group common demodulation reference signal (GC-DMRS) associated with a plurality of UEs that include the UE. The method also includes receiving, at the UE from a base station, a frequency domain resource allocation (FDRA) for a physical downlink shared channel (PDSCH) scheduled for transmission to the UE. The method includes receiving, from the base station, the GC-DMRS and the PDSCH. The method also includes generating a channel estimate based on the GC-DMRS and the allocation of frequency resources to the GC-DMRS. The method further includes demodulating the PDSCH based on the channel estimate.

In an additional aspect of the disclosure, an apparatus configured for wireless communication is disclosed. The apparatus includes at least one processor, and a memory coupled to the at least one processor. The at least one processor is configured to obtain, an allocation of frequency resources for a GC-DMRS associated with a plurality of UEs. The at least one processor is also configured to receive, from a base station, a FDRA for a PDSCH scheduled for transmission. The at least one processor is configured to receive, from the base station, the GC-DMRS and the PDSCH. The at least on processor is also configured to generate a channel estimate based on the GC-DMRS and the allocation of frequency resources to the GC-DMRS. The at least one processor is further configured to demodulate the PDSCH based on the channel estimate.

In an additional aspect of the disclosure, an apparatus configured for wireless communication is disclosed. The apparatus includes means for obtaining, at a UE, an allocation of frequency resources for a GC-DMRS associated with a plurality of UEs that include the UE. The apparatus also includes means for receiving, at the UE from a base station, a FDRA for a PDSCH scheduled for transmission to the UE. The apparatus includes means for receiving, from the base station, the GC-DMRS and the PDSCH. The apparatus also includes means for generating a channel estimate based on the GC-DMRS and the allocation of frequency resources to the GC-DMRS. The apparatus further includes means for demodulating the PDSCH based on the channel estimate.

In an additional aspect of the disclosure, a non-transitory computer-readable medium stores instructions that, when executed by a processor, cause the processor to perform operations. The operations include obtaining, at a UE, an allocation of frequency resources for a GC-DMRS associated with a plurality of UEs that include the UE. The operations also include receiving, at the UE from a base station, a FDRA for a PDSCH scheduled for transmission to the UE. The operations include receiving, from the base station, the GC-DMRS and the PDSCH. The operations also include generating a channel estimate based on the GC-DMRS and the allocation of frequency resources to the GC-DMRS. The operations further include demodulating the PDSCH based on the channel estimate.

In an additional aspect of the disclosure, a method of wireless communication includes determining, at a base station, an allocation of frequency resources for a GC-DMRS associated with a plurality of UEs. The method also includes transmitting, to a UE of the plurality of UEs, a FDRA for a PDSCH scheduled for transmission to the UE. The method further includes transmitting, to the UE, the GC-DMRS and the PDSCH.

In an additional aspect of the disclosure, an apparatus configured for wireless communication is disclosed. The apparatus includes at least one processor, and a memory coupled to the at least one processor. The at least one processor is configured to determine an allocation of frequency resources for a GC-DMRS associated with a plurality of UEs. The at least one processor is also configured to initiate transmission, to a UE of the plurality of UEs, of a FDRA for a PDSCH scheduled for transmission to the UE. The at least one processor is further configured to initiate transmission, to the UE, of the GC-DMRS and the PDSCH.

In an additional aspect of the disclosure, an apparatus configured for wireless communication is disclosed. The apparatus includes means for determining, at a base station, an allocation of frequency resources for a GC-DMRS associated with a plurality of UEs. The apparatus also includes means for transmitting, to a UE of the plurality of UEs, a FDRA for a physical downlink shared channel (PDSCH) scheduled for transmission to the UE. The apparatus further includes means for transmitting, to the UE, the GC-DMRS and the PDSCH.

In an additional aspect of the disclosure, a non-transitory computer-readable medium stores instructions that, when executed by a processor, cause the processor to perform operations. The operations include determining, at a base station, an allocation of frequency resources for a GC-DMRS associated with a plurality of UEs. The operations also include initiating transmission, to a UE of the plurality of UEs, of a FDRA for a PDSCH scheduled for transmission to the UE. The operations further include initiating transmission, to the UE, of the GC-DMRS and the PDSCH.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Figure 1:
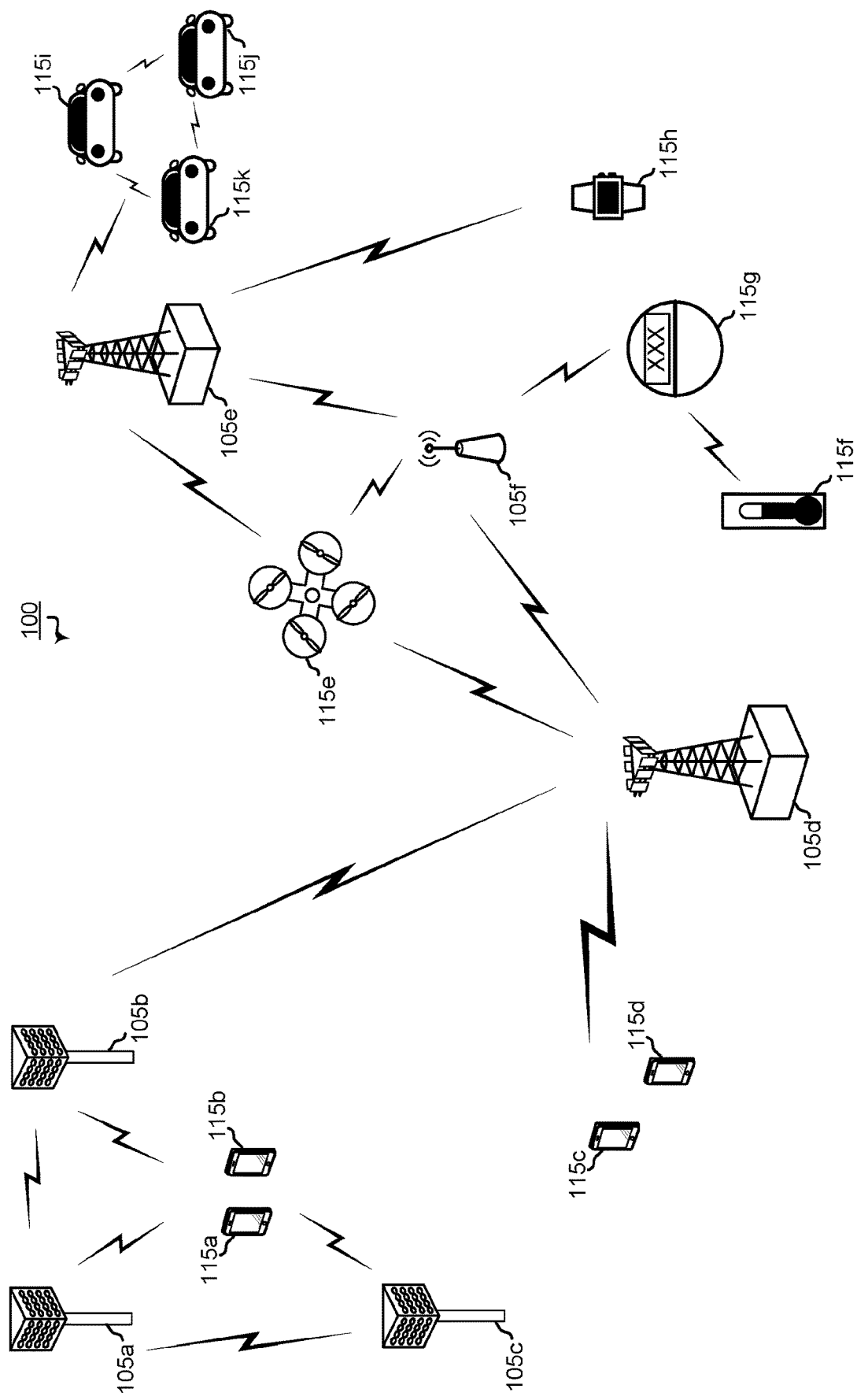
FIG. 1 is a block diagram illustrating details of an example wireless communication system according to some aspects of the present disclosure.

The Appendix provides further details regarding various embodiments of this disclosure and the subject matter therein forms a part of the specification of this application.

DETAILED DESCRIPTION

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media for enabling transmission of a group common demodulation reference signal (GC-DMRS) to multiple user equipments (UEs) of a group. The techniques described herein enable an allocation of resources for the GC-DMRS to be the same size as an allocation of resources to physical downlink shared channels (PDSCHs) for UEs of the group, as compared to allocating resources to UE-specific DMRSs having the same size as an allocation of resources to the UE-specific PDSCH. In this manner, the GC-DMRS may be a wideband signal (as compared to conventional DMRSs), which may improve channel estimation at the UEs based on the GC-DMRS. Additionally, the resources allocated for the PDSCHs for the UEs may be allocated according to a non-contiguous pattern to improve diversity gain.

To illustrate, a base station may determine an allocation of resources (e.g., frequency resources, such as resource blocks (RBs)) for a GC-DMRS associated with a group of UEs. The GC-DMRS may be allocated to the same set of resource block groups (RBGs) that are allocated to PDSCHs for the group of UEs. The base station may provide information associated with the GC-DMRS (e.g., the resource allocation, a DMRS pattern, etc.) and information associated with PDSCHs (e.g., a frequency domain resource allocation (FDRA) for a UE-specific PDSCH within the group PDSCH resources) to the UEs of the group using a variety of messages. In some implementations, the base station may transmit the GC-DMRS information in addition to interlace values and offsets for the PDSCHs in one or more radio resource control (RRC) messages to the UEs of the group, and the base station may transmit the FDRA for each PDSCH in separate downlink control information (DCI) messages (e.g., transmitted via physical downlink control channels (PDCCHs)) to each UE of the group. In some other implementations, the base station may transmit the FDRA for each PDSCH in separate DCI messages (e.g., transmitted via PDCCHs) to each UE of the group, and the base station may transmit the GC-DMRS information in separate piggyback DCI messages (e.g., transmitted via the PDSCHs) to the UEs of the group. In some other implementations, the base station may transmit the GC-DMRS information and the FDRA for the PDSCH in separate DCI messages (e.g., transmitted via PDCCHs) to each UE of the group. In some other implementations, the base station may transmit information associated with a piggyback DCI message and a FDRA for an overall PDSCH resource in a GC-PDCCH to all UEs of the group, the UEs may determine (e.g., infer) the GC-PDSCH information from the FDRA for the overall PDSCH resource, and the base station may transmit the FDRA for the individual PDSCHs in a multi-user (MU) piggyback DCI message in a GC-PDSCH.

After transmitting the above-described information, the base station transmits the GC-DMRS to all UEs of the group, in addition to transmitting the UE-specific PDSCHs to each UE of the group. The UEs may monitor the resources allocated for the GC-DMRS and for the UE-specific PDSCHs to receive the GC-DMRS and the PDSCH from the base station. The UEs may perform channel estimation based on the GC-DMRS and use the channel estimate to demodulate a respective UE-specific PDSCH.

Particular implementations of the subject matter described in this disclosure can be implemented to realize one or more of the following potential advantages. In some aspects, the present disclosure supports transmission of a GC-DMRS to a group of UEs in addition to allocation of resources to UE-specific PDSCHs according to non-contiguous patterns across multiple RBGs. Because the resources allocated to the GC-DMRS may be the same as the resources allocated to all PDSCHs for the group of UEs (instead of the resources allocated to a UE-specific PDSCH), the GC-DMRS may occupy more frequency resources (e.g., be a wideband signal) than a UE-specific DMRS. Increasing the resources occupied by the GC-DMRS may increase channel estimation gains at the UEs based on the GC-DMRS. Additionally, allocating the resources for UE-specific PDSCHs according to a non-contiguous pattern may improve diversity gain at the UEs when receiving the UE-specific PDSCHs. Improving the channel estimation gain and the diversity gain at the UEs may improve accuracy and throughput within a wireless communication system.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
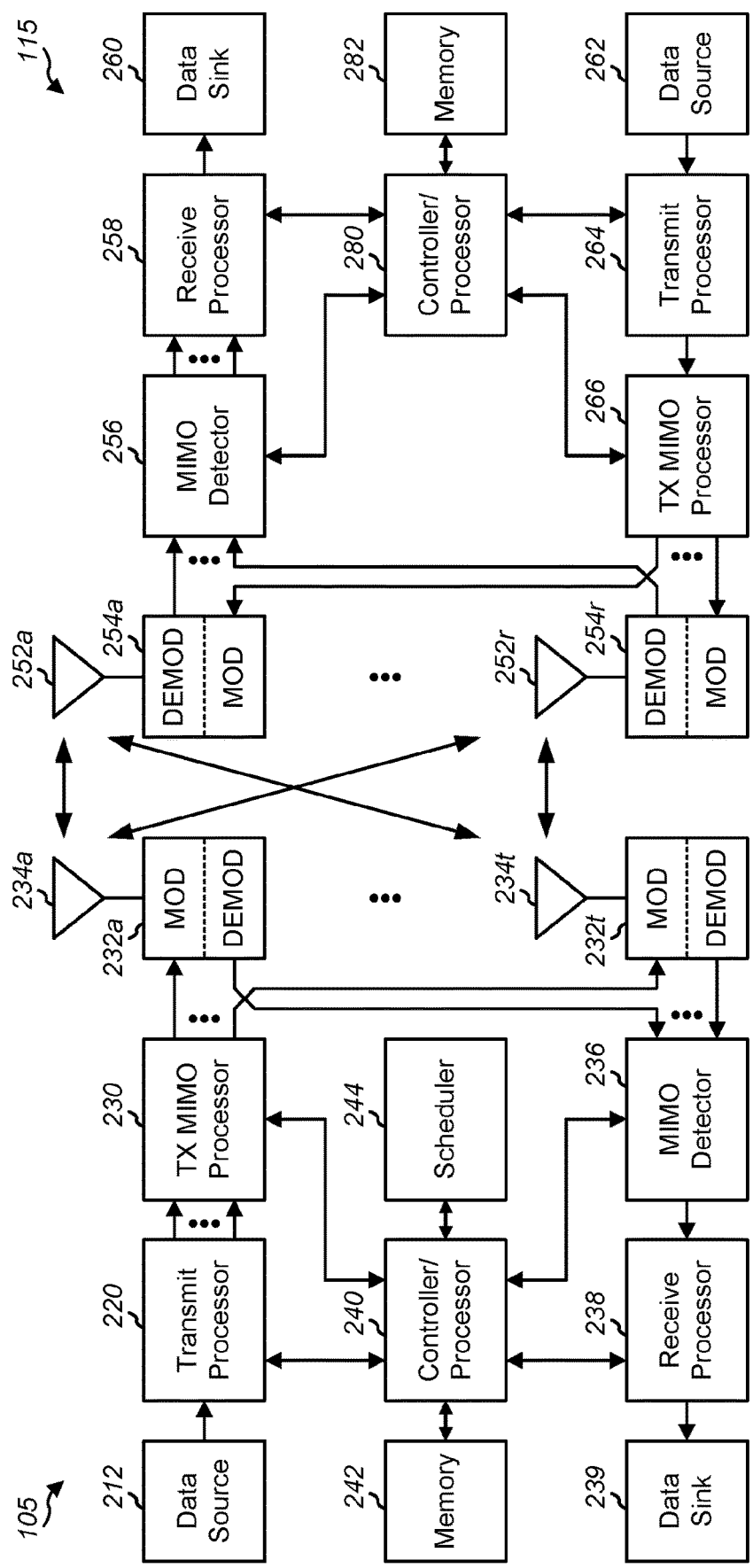
FIG. 2 is a block diagram conceptually illustrating example designs of a base station and a user equipment (UE) configured according to some aspects.

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 11 and 12, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

The present disclosure provides systems, apparatus, methods, and computer-readable media for enabling transmission of a group common demodulation reference signal (GC-DMRS) to multiple UEs of a group. The techniques described herein enable an allocation of resources for the GC-DMRS to be the same size as an allocation of resources to physical downlink shared channels (PDSCHs) for UEs of the group, as compared to allocating resources to UE-specific DMRSs having the same size as an allocation of resources to the UE-specific PDSCH. In this manner, the GC-DMRS may be a wideband signal (as compared to conventional DMRSs), which may improve channel estimation at the UEs based on the GC-DMRS. Additionally, the resources allocated for the PDSCHs for the UEs may be allocated according to a non-contiguous pattern to improve diversity gain.

To illustrate, a base station may determine an allocation of resources (e.g., frequency resources, such as resource blocks (RBs)) for a GC-DMRS associated with a group of UEs. The GC-DMRS may be allocated to the same set of resource block groups (RBGs) that are allocated to PDSCHs for the group of UEs. The base station may provide information associated with the GC-DMRS (e.g., the resource allocation, a DMRS pattern, etc.) and information associated with PDSCHs (e.g., a frequency domain resource allocation (FDRA) for a UE-specific PDSCH within the group PDSCH resources) to the UEs of the group using a variety of messages. In some implementations, the base station may transmit the GC-DMRS information in addition to interlace values and offsets for the PDSCHs in one or more radio resource control (RRC) messages to the UEs of the group, and the base station may transmit the FDRA for each PDSCH in separate downlink control information (DCI) messages (e.g., transmitted via physical downlink control channels (PDCCHs)) to each UE of the group. In some other implementations, the base station may transmit the FDRA for each PDSCH in separate DCI messages (e.g., transmitted via PDCCHs) to each UE of the group, and the base station may transmit the GC-DMRS information in separate piggyback DCI messages (e.g., transmitted via the PDSCHs) to the UEs of the group. In some other implementations, the base station may transmit the GC-DMRS information and the FDRA for the PDSCH in separate DCI messages (e.g., transmitted via PDCCHs) to each UE of the group. In some other implementations, the base station may transmit information associated with a piggyback DCI message and a FDRA for an overall PDSCH resource in a GC-PDCCH to all UEs of the group, the UEs may determine (e.g., infer) the GC-PDSCH information from the FDRA for the overall PDSCH resource, and the base station may transmit the FDRA for the individual PDSCHs in a multi-user (MU) piggyback DCI message in a GC-PDSCH.

After transmitting the above-described information, the base station transmits the GC-DMRS to all UEs of the group, in addition to transmitting the UE-specific PDSCHs to each UE of the group. The UEs may monitor the resources allocated for the GC-DMRS and for the UE-specific PDSCHs to receive the GC-DMRS and the PDSCH from the base station. The UEs may perform channel estimation based on the GC-DMRS and use the channel estimate to demodulate a respective UE-specific PDSCH.

Particular implementations of the subject matter described in this disclosure can be implemented to realize one or more of the following potential advantages. In some aspects, the present disclosure supports transmission of a GC-DMRS to a group of UEs in addition to allocation of resources to UE-specific PDSCHs according to non-contiguous patterns across multiple RBGs. Because the resources allocated to the GC-DMRS may be the same as the resources allocated to all PDSCHs for the group of UEs (instead of the resources allocated to a UE-specific PDSCH), the GC-DMRS may occupy more frequency resources (e.g., be a wideband signal) than a UE-specific DMRS. Increasing the resources occupied by the GC-DMRS may increase channel estimation gains at the UEs based on the GC-DMRS. Additionally, allocating the resources for UE-specific PDSCHs according to a non-contiguous pattern may improve diversity gain at the UEs when receiving the UE-specific PDSCHs. Improving the channel estimation gain and the diversity gain at the UEs may improve accuracy and throughput within a wireless communication system.

Figure 3:
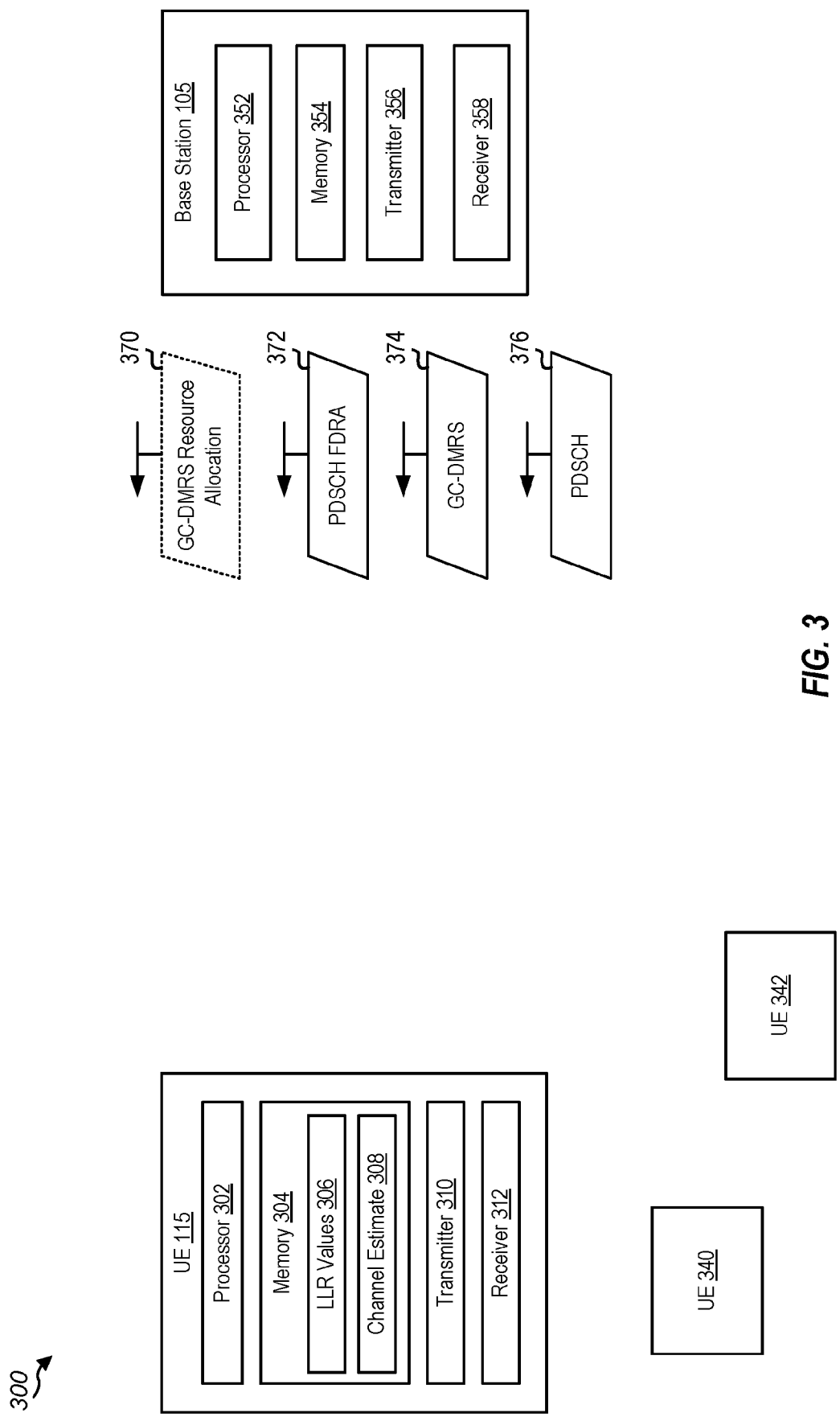
FIG. 3 is a block diagram of an example of a wireless communications system configured to support transmission of a group common demodulation reference signal (GC-DMRS) to multiple UEs according to some aspects.

FIG. 3 is a block diagram of an example wireless communications system 300 that supports transmission of a GC-DMRS to multiple UEs according to some aspects. In some examples, the wireless communications system 300 may implement aspects of the wireless network 100. The wireless communications system 300 includes the UE 115, a second UE 340, a third UE 342, and the base station 105. Although three UEs 115 and 340-342 and one base station 105 are illustrated, in some other implementations, the wireless communications system 300 may generally include more than three UEs or fewer than three UEs, and may include more than one base station 105.

The UE 115 can include a variety of components (such as structural, hardware components) used for carrying out one or more functions described herein. For example, these components can include one or more processors 302 (hereinafter referred to collectively as "the processor 302"), one or more memory devices 304 (hereinafter referred to collectively as "the memory 304"), one or more transmitters 310 (hereinafter referred to collectively as "the transmitter 310"), and one or more receivers 312 (hereinafter referred to collectively as "the receiver 312"). The processor 302 may be configured to execute instructions stored in the memory 304 to perform the operations described herein. In some implementations, the processor 302 includes or corresponds to one or more of the receive processor 258, the transmit processor 264, and the controller/processor 280, and the memory 304 includes or corresponds to the memory 282.

In some implementations, the memory 304 may be configured to store log likelihood ratio (LLR) values 306 and channel estimate 308. The LLR values 306 may be determined by the UE 115 as part of a channel estimation and/or demodulation process performed by the UE 115. The channel estimate 308 may be determined by the UE 115 based on a DMRS, such as a GC-DMRS, received from the base station 105, as further described herein.

The transmitter 310 is configured to transmit reference signals, control information and data to one or more other devices, and the receiver 312 is configured to receive references signals, synchronization signals, control information and data from one or more other devices. For example, the transmitter 310 may transmit signaling, control information and data to, and the receiver 312 may receive signaling, control information and data from, the base station 105. In some implementations, the transmitter 310 and the receiver 312 may be integrated in one or more transceivers. Additionally or alternatively, the transmitter 310 or the receiver 312 may include or correspond to one or more components of the UE 115 described with reference to FIG. 2.

The base station 105 can include a variety of components (such as structural, hardware components) used for carrying out one or more functions described herein. For example, these components can include one or more processors 352 (hereinafter referred to collectively as "the processor 352"), one or more memory devices 354 (hereinafter referred to collectively as "the memory 354"), one or more transmitters 356 (hereinafter referred to collectively as "the transmitter 356"), and one or more receivers 358 (hereinafter referred to collectively as "the receiver 358"). The processor 352 may be configured to execute instructions stored in the memory 354 to perform the operations described herein. In some implementations, the processor 352 includes or corresponds to one or more of the receive processor 238, the transmit processor 220, and the controller/processor 240, and the memory 354 includes or corresponds to the memory 242.

The transmitter 356 is configured to transmit reference signals, synchronization signals, control information and data to one or more other devices, and the receiver 358 is configured to receive reference signals, control information and data from one or more other devices. For example, the transmitter 356 may transmit signaling, control information and data to, and the receiver 358 may receive signaling, control information and data from, the UE 115. In some implementations, the transmitter 356 and the receiver 358 may be integrated in one or more transceivers. Additionally or alternatively, the transmitter 356 or the receiver 358 may include or correspond to one or more components of base station 105 described with reference to FIG. 2.

In some implementations, the wireless communications system 300 implements a 5G New Radio (NR) network. For example, the wireless communications system 300 may include multiple 5G-capable UEs 115 and 340-342 and multiple 5G-capable base stations 105, such as UEs and base stations configured to operate in accordance with a 5G NR network protocol such as that defined by the 3GPP.

During operation of the wireless communications system 300, the base station 105 may configure a GC-DMRS 374 for transmission to a group of UEs that includes the UE 115, the second UE 340, and the third UE 342. Although the group is described as including three UEs, in other implementations, the group may include fewer than three or more than three UEs. The group of UEs may be selected based on data transmission schedules associated with the UEs, geographic locations of the UEs, signal strengths associated with the UEs, or other metrics. The GC-DMRS 374 may differ from UE-specific DMRSs in that the GC-DMRS 374 is to be used for signal estimation by all the UEs of the group and that the GC-DMRS 374 is transmitted via a wider bandwidth (e.g., a wideband reference signal) compared to UE-specific DMRSs. The base station 105 may also configure a PDSCH (e.g., a UE-specific PDSCH) for transmitting one or more messages to each UE in the group.

To configure the GC-DMRS 374 and the PDSCHs, the base station 105 may determine allocations of resources (e.g., time resources, such as slots, symbols, and the like, frequency resources, such as frequency ranges represented by resource blocks (RBs) and the like, or a combination thereof) to the GC-DMRS 374 and an overall set of PDSCH resources, from which resources may be allocated to each PDSCH for the UEs of the group. The base station 105 may allocate the same set of frequency resources and different time resources to the GC-DMRS 374 and the overall set of PDSCH resources. For example, the base station 105 may determine a GC-DMRS resource allocation 370 that includes a set of resource block groups (RBGs), where each RBG includes multiple contiguous RBs, and an overall PDSCH frequency domain resource allocation (FDRA) that includes the same set of RBGs as the GC-DMRS resource allocation 370. Additionally, the GC-DMRS resource allocation 370 may include different time resources (e.g., one or more orthogonal frequency division multiplexing (OFDM) symbols) than time resources allocated to the PDSCHs.

To increase diversity gain at the UEs of the group when receiving the UE-specific PDSCHs (also referred to herein as the individual PDSCHs), the base station 105 may allocate frequency resources of the overall PDSCH FDRA to each individual PDSCH according to a non-contiguous pattern across the set of RBGs of the overall PDSCH FDRA (e.g., a resource bandwidth (BW)). For example, a different RB of each RBG may be allocated to a PDSCH for each UE of the group according to a pattern, and the pattern may be repeated for allocating each other RBG to the PDSCHs for the UEs. In this manner, RBs allocated to a PDSCH for one UE are separated in frequency by RBs allocated to PDSCHs for other UEs of the group. In this manner, the base station 105 may determine a respective PDSCH FDRA for each UE of the group from the set of RBGs of the overall PDSCH FDRA. Particular examples of resource allocation to a GC-DMRS and to PDSCHs for UEs are described further herein with reference to FIGS. 5, 7, and 10.

Because the GC-DMRS resource allocation 370 may include more frequency resources than frequency resources allocated to any individual PDSCH, and because the individual PDSCH FDRAs may include non-contiguous resources, the base station 105 may communicate the GC- DMRS resource allocation 370 (or sufficient information to enable determination at the UEs of the GC-DMRS resource allocation 370) and the individual PDSCH FDRAs prior to transmission of the GC-DMRS 374 and the individual PDSCHs. For example, the base station 105 may transmit the GC-DMRS resource allocation 370 (or information enabling determination of the GC-DMRS resource allocation 370) and a PDSCH FDRA 372 that is associated with the UE 115 to the UE 115. In a similar manner, the base station 105 may transmit the GC-DMRS resource allocation 370 and a respective PDSCH FDRA to each of the second UE 340 and the third UE 342. The base station 105 may communicate this information using a variety of different messages and signaling.

Figure 4:
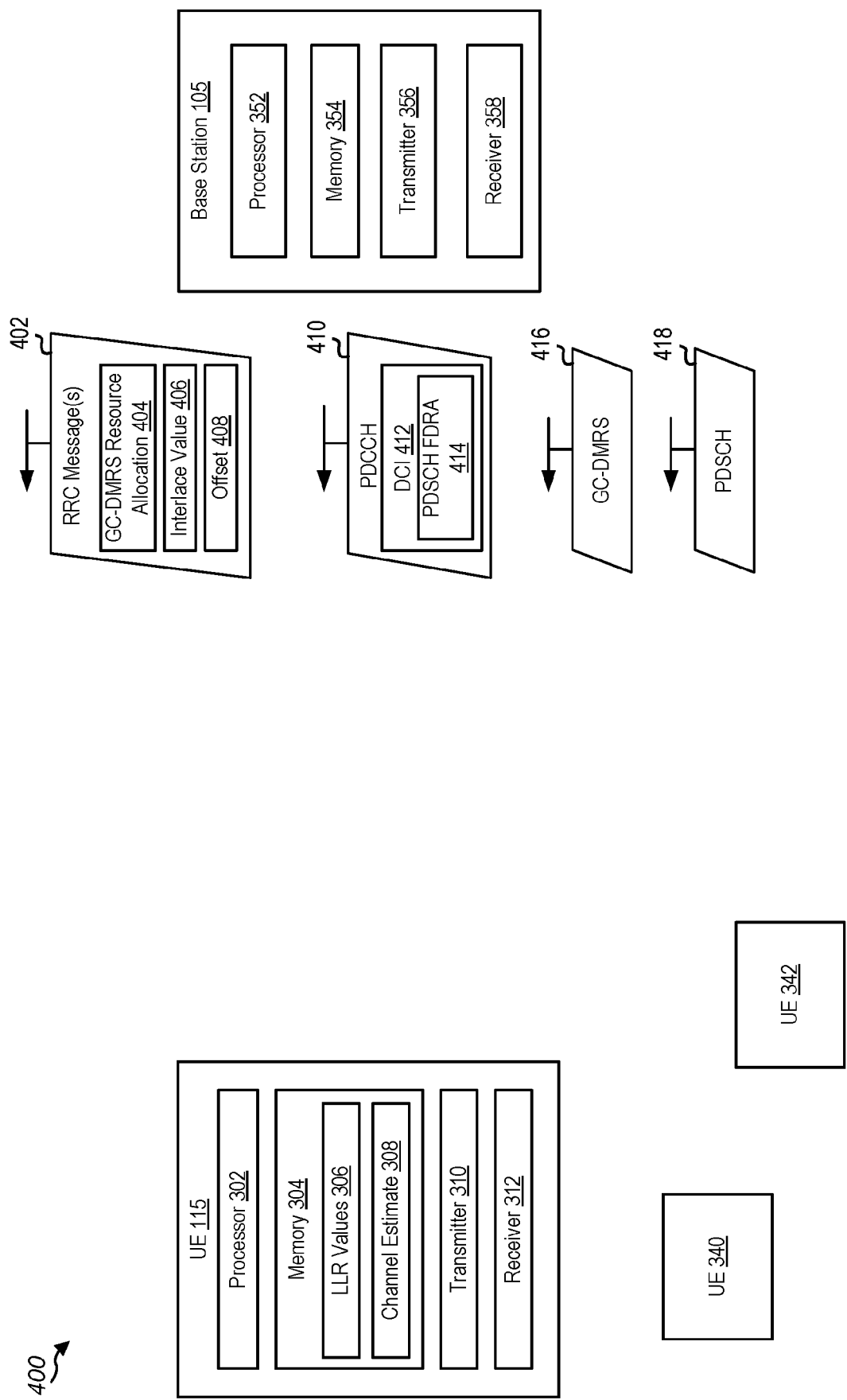
FIG. 4 is a block diagram of a first example of transmission of the GC-DMRS within the wireless communications system of FIG. 3.
Figure 5:
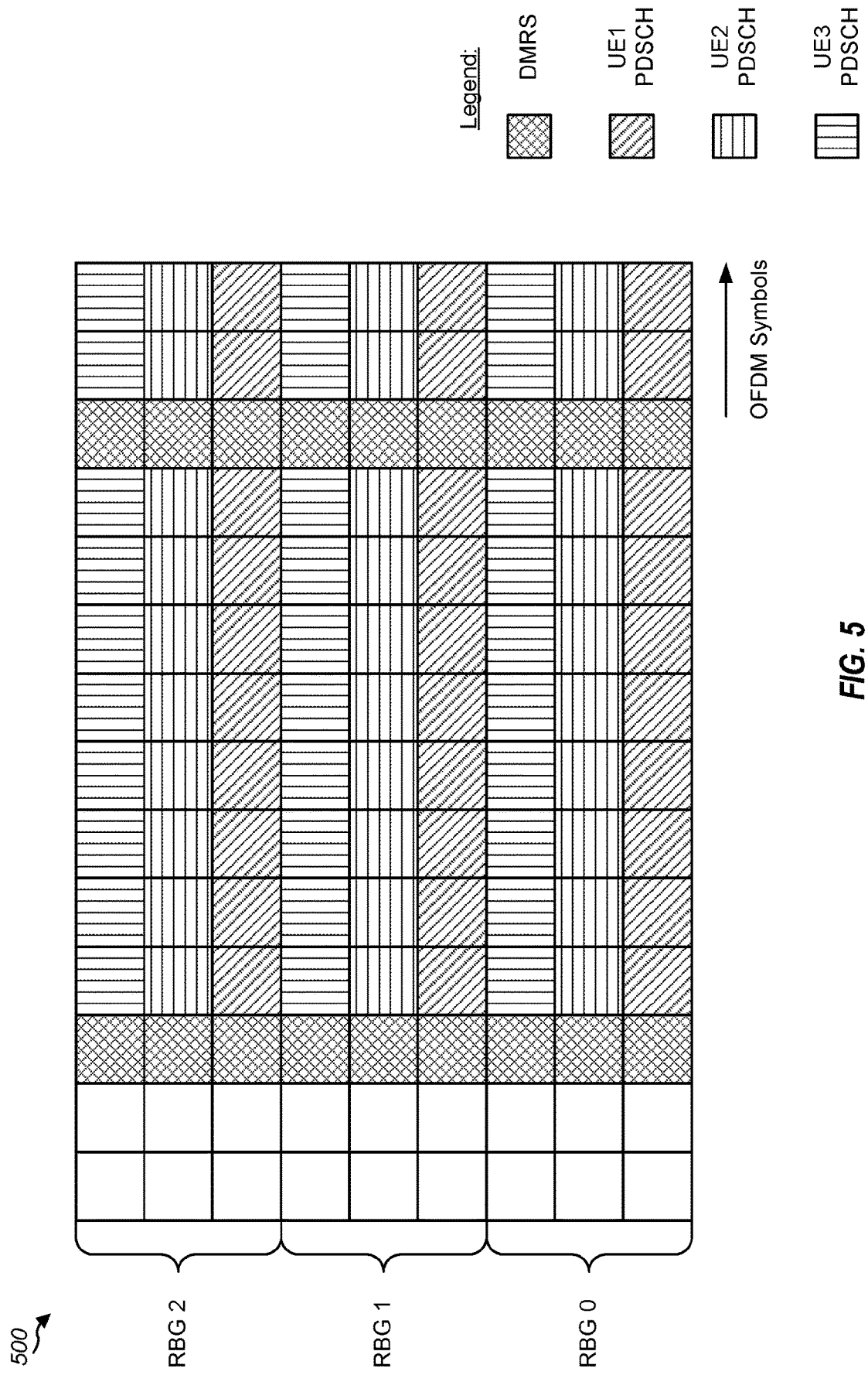
FIG. 5 is a diagram of GC-DMRS and PDSCH allocation performed by the wireless communications system of FIG. 4.

In some implementations, the base station 105 may transmit the GC-DMRS resource allocation 370, in addition to an interlace value and an offset associated with the PDSCH FDRA 372, in one or more radio resource control (RRC) messages to the UE 115, and the base station 105 may transmit the PDSCH FDRA 372 in a downlink control information (DCI) message (e.g., transmitted via an individual physical downlink control channel (PDCCH)) to the UE 115, as described further herein with reference to FIGS. 4 and 5. In some other implementations, the base station 105 may transmit the PDSCH FDRA 372 in a DCI message (e.g., transmitted via an individual PDCCH) to the UE 115, and the base station 105 may transmit the GC-DMRS resource allocation 370 in a piggyback DCI message (e.g., transmitted via an individual PDSCH) to the UE 115, as described further herein with reference to FIGS. 6 and 7. As used herein, a "piggyback DCI message" refers to a DCI message that is transmitted in a PDSCH instead of a PDCCH, and that typically includes control information for messages transmitted via a remainder of the PDSCH. A piggyback DCI message may also be referred to as "a DCI-2 message." In some other implementations, the base station 105 may transmit the GC-DMRS resource allocation 370 and the PDSCH FDRA 372 in a DCI message (e.g., transmitted via an individual PDCCH) to the UE 115, as described further herein with reference to FIG. 8. Such DCI message may include fields for the GC-DMRS resource allocation 370 and the PDSCH FDRA 372, unlike legacy DCI messages. In any of the above-described implementations, the base station 105 may transmit similar messages to communicate the GC-DMRS resource allocation 370 and a respective PDSCH FDRA to the other UEs of the group (e.g., the second UE 340 and the third UE 342). In some other implementations, the base station 105 may transmit information associated with piggyback DCI messages and the overall PDSCH FDRA in a DCI message transmitted via a GC-PDCCH to all UEs of the group, as described further herein with reference to FIGS. 9 and 10. The UEs of the group may determine (e.g., infer) the GC-DMRS resource allocation 370 from the overall PDSCH FDRA. The base station 105 may also transmit a multi-user (MU) piggyback DCI message via a GC-PDSCH transmitted to all UEs of the group. The MU piggyback DCI may include a sub-header for each UE in the group that includes a PDSCH FDRA for a PDSCH associated with the respective UE.

After transmitting the GC-DMRS resource allocation 370 (or the overall PDSCH FDRA) and the PDSCH FDRA 372, the base station 105 may transmit the GC-DMRS 374 and a PDSCH 376 associated with the UE 115 to the UE 115. The base station 105 may similarly transmit the GC-DMRS 374 and an individual PDSCH to the other UEs of the group (e.g., the second UE 340 and the third UE 342). The UE 115 may receive (or determine) the GC-DMRS resource allocation 370 and the PDSCH FDRA 372 from the base station 105, and the UE 115 may monitor the resources indicated by the GC-DMRS resource allocation 370 to receive the GC-DMRS 374. Additionally, the UE 115 may monitor the resources indicated by the PDSCH FDRA 372 to receive the PDSCH 376. Monitoring the indicated resources may include tuning one or more components of the receiver 312, such as filters, oscillators or other frequency references, and the like, based on the GC-DMRS resource allocation 370 and the PDSCH FDRA 372. The UE 115 may perform channel estimation based on the GC-DMRS 374 to generate the channel estimate 308 for a wireless channel between the UE 115 and the base station 105. The UE 115 may also demodulate the PDSCH 376 based on the channel estimate 308, such as to receive one or more downlink (DL) messages from the base station 105. In some implementations, demodulating the PDSCH 376 may include the UE 115 determining the LLR values 306 based on the channel estimate 308 and associated with the PDSCH FDRA 372, and the UE 115 using the LLR values 306 as during a demodulation process for the PDSCH 376. For example, the UE 115 may UE 115 may perform the channel estimation in a wider band (e.g., the GC-DMRS resource allocation 370) and may calculate the LLR values 306 in a narrower, UE-specific band (e.g., the PDSCH FDRA 372).

As described with reference to FIG. 3, the present disclosure provides techniques for configuration and transmission of the GC-DMRS 374 to a group of UEs (e.g., the UEs 115, 340, and 342). Because the GC-DMRS resource allocation 370 may include the same frequency resources as those of the overall PDSCH FDRA for the group of UEs, the GC-DMRS 374 may occupy more frequency resources (e.g., a wider band) than a UE-specific DMRS. Increasing the resources occupied by the GC-DMRS 374, and thus used for channel estimation at the UEs, may increase channel estimation gains at the UEs. Additionally, the present disclosure provides techniques supporting allocation of frequency resources to individual PDSCHs according to non-contiguous patterns across multiple RBGs. For example, the PDSCH FDRA 372 may include a non-contiguous pattern across the set of RBGs of the overall PDSCH FDRA. Allocating the frequency resources for individual PDSCHs according to such non-contiguous patterns may improve diversity gain at the UEs of the group when receiving the individual PDSCHs. Improving the channel estimation gain and the diversity gain at the UEs of the group may improve accuracy and throughput within the wireless communications system 300.

FIG. 4 is a block diagram of a first example of transmission of the GC-DMRS 374 within the wireless communications system 300 of FIG. 3. FIG. 4 depicts a wireless communications system 400 that includes the devices and components of the wireless communications system 300 of FIG. 3. However, one or more operations or messages described with reference to the wireless communications system 400 may differ from operations or messages described with reference to the wireless communications system 300 of FIG. 3. In the example of FIG. 4, information related to the GC-DMRS and the individual PDSCHs may be transmitted to the UEs of the group at least partially using separate PDCCH transmissions to the UEs.

During operation of the wireless communications system 400, the base station 105 may determine a GC-DMRS resource allocation 404 and an overall PDSCH FDRA for the group of UEs (e.g., the UE 115, the second UE 340, and the third UE 342), as described with reference to FIG. 3. For example, the GC-DMRS resource allocation 404 may include or correspond to the GC-DMRS resource allocation 370 of FIG. 3. In some implementations, the UEs may be selected for inclusion in a group for DMRS transmission based on the UEs being associated with (e.g., configured for) a same scramble identifier (ID), a same DMRS type, a same PDSCH mapping type, and a same rank.

To communicate the GC-DMRS resource allocation 404, the base station 105 may transmit one or more RRC messages 402 that indicate the GC-DMRS resource allocation 404 to the UE 115 (and similarly to the second UE 340 and the third UE 342). The GC-DMRS resource allocation 404 may indicate the frequency resources (e.g., the set of RBGs) allocated to GC-DMRS transmission, as well as a DMRS pattern used for DMRS generation. In the example of FIG. 4, the RRC messages 402 may indicate a single DMRS pattern to the UEs of the group. In some implementations, the DMRS pattern may be a selected DMRS pattern from a group of DMRS patterns used for GC-DMRS transmission. For example, the GC-DMRS resource allocation 404 may be allocated according to a different pattern than resources allocated for another GC-DMRS associated with a different group of UEs. Each DMRS pattern may be associated with a different frequency granularity. Larger frequency granularities may be associated with higher channel estimation gains and less flexibility, while smaller frequency granularities may be associated with smaller channel estimation gains and more flexibility. In some other implementations, resources for all DMRSs within the wireless communications system 400 may be allocated according to a single fixed pattern. Using a single fixed pattern may simplify signaling used to communicate the GC-DMRS resource allocation 404 (or other DMRS resource allocations), which may be particularly beneficial for industrial Internet of Things (IIoT) devices that have reduced hardware and processing capabilities as compared to other types of UEs (e.g., smartphones, vehicles, etc.).

The RRC messages 402 may also indicate an interlace value 406 and an offset 408. The offset 408 may represent a RB offset relative to a beginning of a RBG for a RB allocated to a PDSCH for the UE 115, and the interlace value 406 may represent a number of RBs between successive RBs allocated to the PDSCH for the UE 115, as further described herein with reference to FIG. 5. Because each RB allocated to the PDSCH for the UE 115 is separated from other RBs by RBs allocated to other PDSCHs for other UEs of the group, the allocation of resources to the PDSCH for the UE 115 may be according to a non-contiguous pattern. The interlace value 406 and the offset 408 may enable the UE 115 to determine which RBs of the overall PDSCH FDRA are allocated to the PDSCH for the UE 115 (after receiving an indication of the FDRA).

To communicate the allocation of PDSCH resources to the UE 115, the base station 105 may transmit a DCI message 412 within a PDCCH 410 to the UE 115. The DCI message 412 may indicate a PDSCH FDRA 414 associated with the UE 115. For example, a field of the DCI message 412 may include a bitmap or other indicator that represents a set of RBGs of a resource BW that are allocated to PDSCH transmissions for the group of UEs, such that the set of RBGs includes RBs allocated to a PDSCH for the UE 115. The PDSCH FDRA 414 may include or correspond to the PDSCH FDRA 372 of FIG. 3. In some implementations, the PDSCH FDRA 414 may be the same as the overall PDSCH FDRA. In some other implementations, the PDSCH FDRA 414 may be a subset of the overall PDSCH FDRA. Because the RRC messages 402 include the interlace value 406 and the offset 408 and the DCI message 412 includes the PDSCH FDRA 414, the combination of the RRC messages 402 and the DCI message 412 may achieve an allocation of resources to a PDSCH for the UE 115 according to a non-contiguous pattern.

After transmitting the RRC messages 402 and the DCI message 412, the base station 105 may transmit a GC-DMRS 416 and a PDSCH 418 to the UE 115. The GC-DMRS 416 may include or correspond to the GC-DMRS 374 of FIG. 3, and the PDSCH 418 may include or correspond to the PDSCH 376 of FIG. 3. The base station 105 may similarly transmit RRC messages, DCI messages, the GC-DMRS 416, and an individual PDSCH to the other UEs of the group (e.g., the second UE 340 and the third UE 342). The UE 115 may receive the RRC messages 402 and the DCI message 412 from the base station 105, and the UE 115 may monitor the resources indicated by the GC-DMRS resource allocation 404 to receive the GC-DMRS 416. Additionally, the UE 115 may monitor the resources indicated by the PDSCH FDRA 414, in combination with the interlace value 406 and the offset 408, to receive the PDSCH 418. The UE 115 may perform channel estimation based on the GC-DMRS 416 to generate the channel estimate 308 for the wireless channel between the UE 115 and the base station 105. The UE 115 may also demodulate the PDSCH 418 based on the channel estimate 308, such as to receive one or more DL messages from the base station 105.

As described with reference to FIG. 4, the present disclosure provides techniques for sharing the GC-DMRS 416 between a group of UEs (e.g., the UEs 115, 340, and 342) and for allocating individual PDSCH resources according to a non-contiguous pattern. Using the GC-DMRS 416 to perform channel estimation may increase channel estimation gains at the UEs of the group, and allocating individual PDSCH resources according to non-contiguous patterns may increase diversity gains at the UEs of the group. Additionally, using the RRC messages 402 and the DCI message 412 may enable communication of the GC-DMRS resource allocation 404 and the PDSCH FDRA 414 to the UE 115 using legacy wireless communication schemes, as compared to the techniques described with reference to FIGS. 8-10.

FIG. 5 is a diagram of GC-DMRS and PDSCH allocation performed by the wireless communications system 400 of FIG. 4. FIG. 5 includes a resource diagram 500 having time resources (e.g., OFDM symbols) in the horizontal/x direction and frequency resources (e.g., RBs) in the vertically direction. As illustrated in FIG. 5, resources may be allocated from a resource BW that includes a set of three RBGs (e.g., RBG 0, RBG 1, and RBG 2) that each include three RBs. In other implementations, the resource BW may include fewer than three or more than three RBGs, and each RBG may include fewer than three or more than three RBs. Additionally, resources may be allocated for sets of fourteen OFDM symbols, as illustrated in FIG. 5, or for sets including fewer than fourteen or more than fourteen OFDM symbols.

In the example of FIG. 5, resources may be allocated according to the GC-DMRS resource allocation 404 and PDSCH FDRAs, including the PDSCH FDRA 414, of FIG. 4. To illustrate, the GC-DMRS resource allocation 404 may include an allocation to each of the RBGs 0-2. Additionally, the GC-DMRS resource allocation 404 may indicate a DMRS pattern associated with location of DMRS resources at the third OFDM symbol and the twelfth OFDM symbol. In other implementations, the GC-DMRS resource allocation 404 may include less than the three RBGs 0-2 and/or may have a different pattern.

An overall PDSCH FDRA may include each of the RBGs 0-2 (e.g., the overall PDSCH FDRA and the GC-DMRS resource allocation 404 may include the same frequency resources), and each individual PDSCH FDRA may include a subset of the overall PDSCH FDRA. For example, the resources allocated to a PDSCH for the UE 115 (e.g., UE1) may include a first RB of RBG0, a first RB of RBG 1, and a first RB of RBG 2, the resources allocated to a PDSCH for the second UE 340 (e.g., UE2) may include a second RB of RBG 0, a second RB of RBG 1, and a second RB of RBG 2, and the resources allocated to a PDSCH for the third UE 342 (e.g., UE3) may include a third RB of RBG 0, a third RB of RBG 1, and a third RB of RBG 2. In this manner, the individual PDSCH FDRAs may be allocated according to a non-contiguous pattern across the RBGs 0-2. In other implementations, the PDSCH FDRAs may include different resources than illustrated in FIG. 5.

In some implementations, the GC-DMRS resource allocation 404 and/or the overall PDSCH FDRA may be represented by a bitmap. For example, for the resource BW illustrated in FIG. 5 that includes three consecutive RBGs (e.g., RBGs 0-2), a bitmap indicating the GC-DMRS resource allocation 404 and the overall PDSCH FDRA may be 111. In other implementations, if the resource BW includes additional RBGs that are not used for the group of UEs (e.g., RBGs that are associated with other ranks), the bitmap may be larger, such as 111000, which indicates that the GC-DMRS and the overall PDSCH resources are allocated to RBGs 0-2 and not RBGs 3-5 (not shown). As described with reference to FIG. 4, the individual PDSCH FDRAs may also be represented by bitmaps, and the individual PDSCH FDRAs may be the same as the overall PDSCH FDRA. In order to indicate the non-contiguous pattern of resource allocation, respective interlace values and offsets may be used. To illustrate, for the example of FIG. 5, the PDSCH FDRA 414 may be indicated by the bitmap 111, the interlace value 406 may be three, and the offset 408 may be zero. A PDSCH FDRA for the second UE 340 may be indicated by the bitmap 111, an interlace value for the second UE 340 may be three, and an offset for the second UE 340 may be one. A PDSCH FDRA for the third UE 342 may be indicated by the bitmap 111, an interlace value for the third UE 342 may be three, and an offset for the third UE 342 may be two.

The interlace value may represent the number of RBs between consecutive RBs allocated to a PDSCH for a respective UE. For example, in FIG. 5, consecutive RBs allocated to PDSCHs for each UE may be located every three RBs across the RBGs 0-2. Stated another way, for RBGs that include three RBs and that are allocated to three UEs, an interlace value of three indicates that ⅓ of each RBG is allocated to each UE. The offset may indicate a RB offset relative to a beginning of a RBG for a RB allocated to a PDSCH for a respective UE. For example, the UE 115 may be associated with an offset of zero, indicating that the PDSCH for the UE 115 is allocated the first RB of each RBG. As another example, the second UE 340 may be associated with an offset of one, indicating that the PDSCH for the second UE 340 is allocated the second RB of each RBG (e.g., an RB that is offset from the first RB by one).

Thus, as described with reference to FIG. 4, the GC-DMRS resource allocation 404 may include more RBs than a UE-specific DMRS resource allocation (which includes the same RBs as the individual PDSCH for the respective UE, in this example ⅓ the RBs). Additionally, by using individual PDSCH FDRAs, interlace values, and offsets, allocation of non-contiguous resources to individual PDSCHs may be communicated to the UEs.

Figure 6:
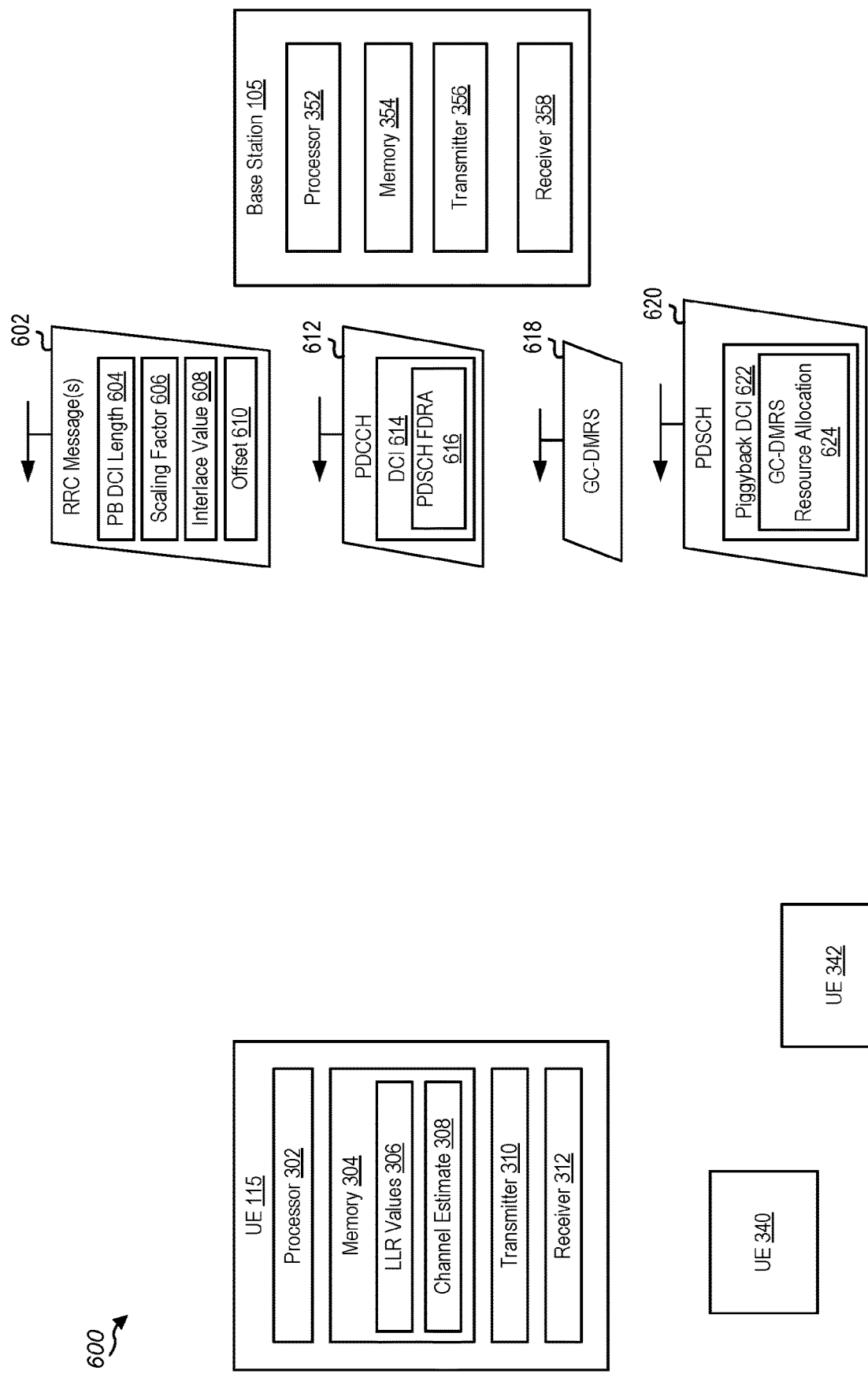
FIG. 6 is a block diagram of a second example of transmission of the GC-DMRS within the wireless communications system of FIG. 3.

FIG. 6 is a block diagram of a second example of transmission of the GC-DMRS 374 within the wireless communications system 300 of FIG. 3. FIG. 6 depicts a wireless communications system 600 that includes the devices and components of the wireless communications system 300 of FIG. 3. However, one or more operations or messages described with reference to the wireless communications system 600 may differ from operations or messages described with reference to the wireless communications system 300 of FIG. 3. In the example of FIG. 6, information related to the GC-DMRS and the individual PDSCHs may be transmitted to the UEs of the group at least partially using separate PDCCH transmissions to the UEs.

During operation of the wireless communications system 600, the base station 105 may determine a GC-DMRS resource allocation 624 and an overall PDSCH FDRA for the group of UEs (e.g., the UE 115, the second UE 340, and the third UE 342), as described with reference to FIG. 3. For example, the GC-DMRS resource allocation 624 may include or correspond to the GC-DMRS resource allocation 370 of FIG. 3. In some implementations, the UEs may be selected for inclusion in a group for DMRS transmission based on the UEs being associated with (e.g., configured for) a same scramble ID, a same DMRS type, a same PDSCH mapping type, and a same rank.

To communicate GC-DMRS-related information, the base station 105 may transmit one or more RRC messages 602 to the UE 115 (and similarly to the second UE 340 and the third UE 342). The RRC messages 602 may indicate a piggyback DCI length 604 and a coding rate scaling factor 606 associated with a piggyback DCI message 622 that will be used by the base station 105 to communicate the GC-DMRS resource allocation 624. In some implementations, each piggyback DCI message used to communicate the GC-DMRS resource allocation 624 to the UEs of the group may have a fixed size (e.g., the piggyback DCI length 604) of M bits. The coding rate scaling factor 606 may include or correspond to a coding rate scaling factor $\beta_{offset}$, which has a value greater than one and is used to obtain a lower code rate than an MCS associated with a PDSCH used to transmit the piggyback DCI message. $\beta_{offset}$ may be based on the number of resource elements (REs) per layer for DCI ($N_{RE,DCI}$), according to Equation 1 below.

$$N_{RE,DCI} = \frac{K_{DCI} \cdot \beta_{offset}}{K_{DL-SCH}} N_{RE} \qquad \text{Equation 1}$$

where $N_{RE}$ is the total number of REs per layer of the PDSCH, $K_{DL-SCH}$ is the payload size of DL-SCH including transport block/code block (TB/CB) cyclic redundancy check (CRC) bits, and $K_{DCI}$ is the number of DCI payload size including CRC bits (if any).

The RRC messages 602 may also indicate an interlace value 608 and an offset 610. The offset 610 may represent a RB offset relative to a beginning of a RBG for a RB allocated to a PDSCH for the UE 115, and the interlace value 608 may represent a number of RBs between successive RBs allocated to the PDSCH for the UE 115. Because each RB allocated to the PDSCH for the UE 115 is separated from other RBs by RBs allocated to other PDSCHs for other UEs of the group, the allocation of resources to the PDSCH for the UE 115 may be according to a non-contiguous pattern. The interlace value 608 and the offset 610 may enable the UE 115 to determine which RBs of the overall PDSCH FDRA are allocated to the PDSCH for the UE 115 (after receiving an indication of the FDRA).

To communicate the allocation of PDSCH resources to the UE 115, the base station 105 may transmit a DCI message 614 within a PDCCH 612 to the UE 115. The DCI message 614 may indicate a PDSCH FDRA 616 associated with the UE 115. For example, a field of the DCI message 614 may include a bitmap or other indicator that represents a set of RBGs of a resource BW that are allocated to PDSCH transmissions for the group of UEs, such that the set of RBGs includes RBs allocated to a PDSCH for the UE 115. The PDSCH FDRA 616 may include or correspond to the PDSCH FDRA 372 of FIG. 3. In some implementations, the PDSCH FDRA 616 may be the same as the overall PDSCH FDRA. In some other implementations, the PDSCH FDRA 616 may be a subset of the overall PDSCH FDRA. Because the RRC messages 602 include the interlace value 608 and the offset 610 and the DCI message 614 includes the PDSCH FDRA 616, the combination of the RRC messages 602 and the DCI message 614 may achieve an allocation of resources to a PDSCH for the UE 115 according to a non-contiguous pattern.

After transmitting the RRC messages 602 and the DCI message 614, the base station 105 may transmit a GC-DMRS 618 and a PDSCH 620 to the UE 115. The GC-DMRS 618 may include or correspond to the GC-DMRS 374 of FIG. 3, and the PDSCH 620 may include or correspond to the PDSCH 376 of FIG. 3. To communicate the GC-DMRS resource allocation 624, the base station 105 may transmit a piggyback DCI message 622 via the PDSCH 620 to the UE 115. The GC-DMRS resource allocation 624 may indicate the frequency resources (e.g., the set of RBGs) allocated to the GC-DMRS 618, as well as a DMRS pattern used for the GC-DMRS 618 (e.g., a fixed pattern or one of a group of DMRS patterns). The piggyback DCI message 622 may be the first message transmitted via the PDSCH 620 (e.g., the piggyback DCI message 622 may be located in the beginning of the PDSCH 620). The piggyback DCI message 622 may have the piggyback DCI length 604. Additionally or alternatively, the base station 105 may perform quadrature phase shift keying (QPSK) and code rate scaling (based on the coding rate scaling factor 606) to transmit the piggyback DCI message 622 via the PDSCH 620. The base station 105 may similarly transmit RRC messages, DCI messages, the GC-DMRS 618, and an individual PDSCHs (including piggyback DCI messages) to the other UEs of the group (e.g., the second UE 340 and the third UE 342).

The UE 115 may receive the RRC messages 602 and the DCI message 614 from the base station 105, and the UE 115 may monitor the resources indicated by the PDSCH FDRA 616, in combination with the interlace value 608 and the offset 610, to receive the PDSCH 620. The UE 115 may receive the piggyback DCI message 622 via the PDSCH 620, and the UE 115 may monitor the resources indicated by the GC-DMRS resource allocation 624 to receive the GC-DMRS 618. The UE 115 may perform channel estimation based on the GC-DMRS 618 to generate the channel estimate 308 for the wireless channel between the UE 115 and the base station 105. The UE 115 may also demodulate a remainder of the PDSCH 620 based on the channel estimate 308, such as to receive one or more DL messages from the base station 105. The other UEs of the group may similarly perform channel estimation based on the GC-DMRS 618 and demodulate the individual PDSCHs based on the respective channel estimates.

As described with reference to FIG. 6, the present disclosure provides techniques for sharing the GC-DMRS 618 between a group of UEs (e.g., the UEs 115, 340, and 342) and for allocating individual PDSCH resources according to a non-contiguous pattern. Using the GC-DMRS 618 to perform channel estimation may increase channel estimation gains at the UEs of the group, and allocating individual PDSCH resources according to non-contiguous patterns may increase diversity gains at the UEs of the group. Additionally, using the RRC messages 602, the DCI message 614, and the piggyback DCI message 622 may enable communication of the GC-DMRS resource allocation 624 and the PDSCH FDRA 616 to the UE 115 using legacy wireless communication schemes, as compared to the techniques described with reference to FIGS. 8-10.

Figure 7:
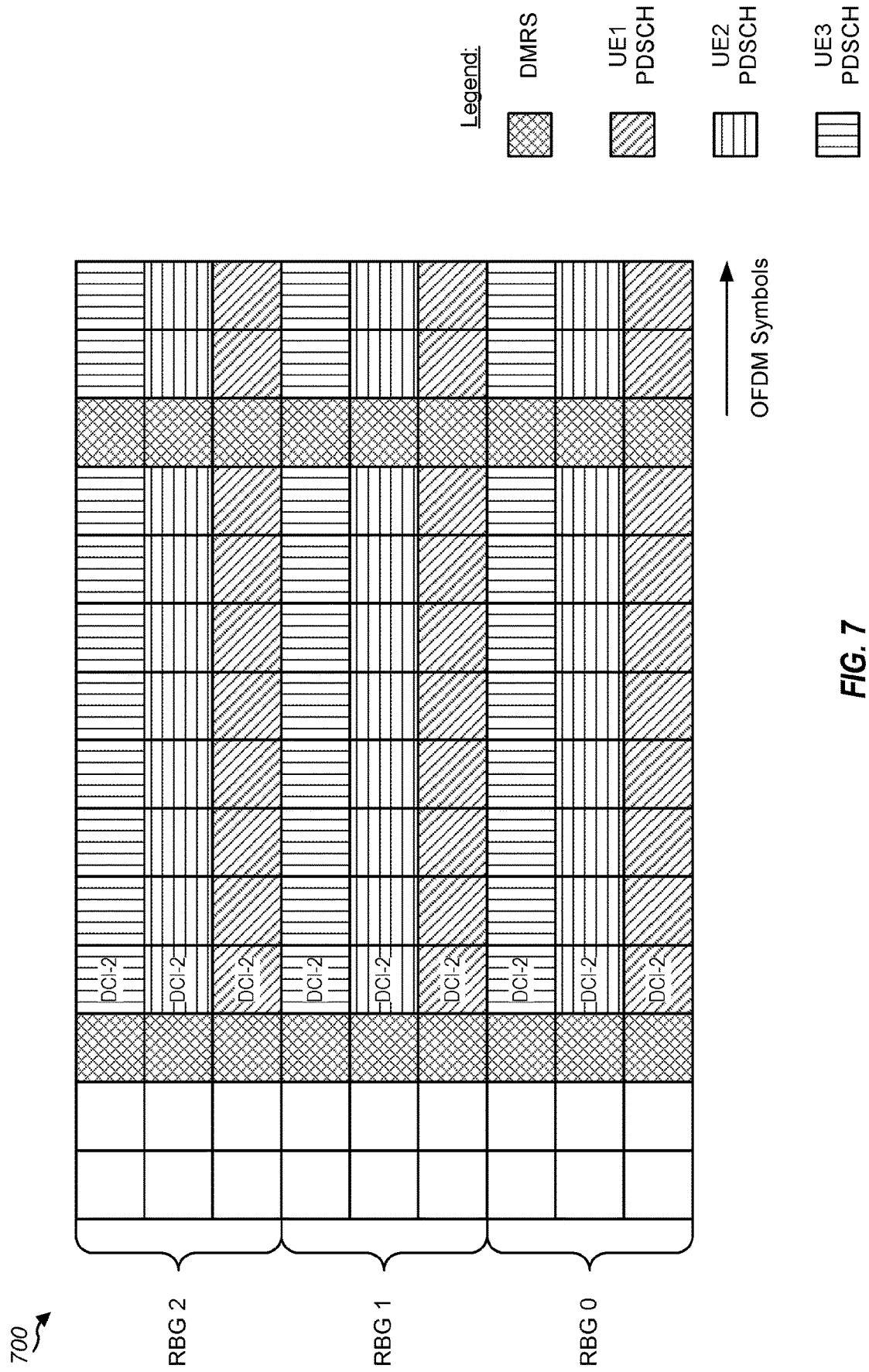
FIG. 7 is a diagram of GC-DMRS and PDSCH allocation performed by the wireless communications system of FIG. 6.

FIG. 7 is a diagram of GC-DMRS and PDSCH allocation performed by the wireless communications system 600 of FIG. 6. FIG. 7 includes a resource diagram 700 having time resources (e.g., OFDM symbols) in the horizontal/x direction and frequency resources (e.g., RBs) in the vertically direction. As illustrated in FIG. 7, resources may be allocated from a resource BW that includes a set of three RBGs (e.g., RBG 0, RBG 1, and RBG 2) that each include three RBs. In other implementations, the resource BW may include fewer than three or more than three RBGs, and each RBG may include fewer than three or more than three RBs. Additionally, resources may be allocated for sets of fourteen OFDM symbols, as illustrated in FIG. 7, or for sets including fewer than fourteen or more than fourteen OFDM symbols.

In the example of FIG. 7, resources may be allocated according to the GC-DMRS resource allocation 624 and PDSCH FDRAs, including the PDSCH FDRA 616, of FIG. 6. As shown in FIG. 7, the particular resource allocations may be the same as described with reference to FIG. 5, including use of the same bitmaps, interlace values, and offsets to communicate the resource allocations. However, in the example of FIG. 7, the individual PDSCHs may include piggyback DCI messages (e.g., DCI-2 messages) for the respective UE. For example, for the fourth OFDM symbol, the first RB of RBG 0, the first RB of RBG 1, and the first RB of RBG 2 may be allocated for the piggyback DCI message 622, the second RB of RBG 0, the second RB of RBG 1, and the second RB of RBG 2 may be allocated for a piggyback DCI message to the second UE 340, and the third RB of RBG 0, the third RB of RBG 1, and the third RB of RBG 2 may be allocated for a piggyback DCI message to the third UE 342. As described with reference to FIG. 6, a UE may determine the resources allocated to the respective individual PDSCH based on the individual PDSCH FDRA, the interlace value, and the offset, and the piggyback DCI message may be the first message in the individual PDSCH and have a size indicated by an RRC message. The respective piggyback DCI message may indicate the GC-DMRS resource allocation 624.

Thus, as described with reference to FIG. 6, the GC-DMRS resource allocation 624 may include more RBs than a UE-specific DMRS resource allocation (which includes the same RBs as the individual PDSCH for the respective UE, in this example ⅓ the RBs). Additionally, by using individual PDSCH FDRAs, interlace values, and offsets, allocation of non-contiguous resources to individual PDSCHs may be communicated to the UEs.

Figure 8:
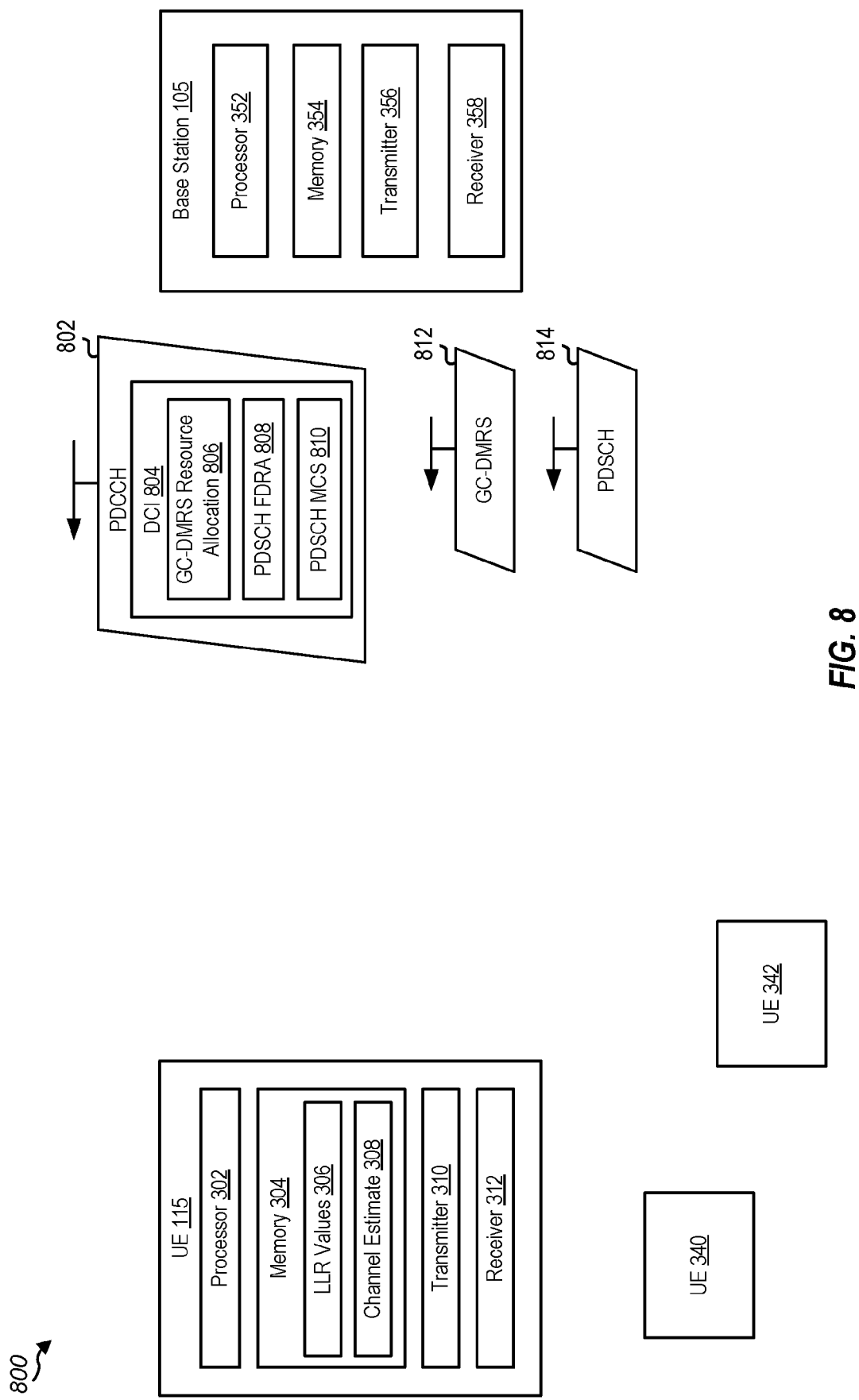
FIG. 8 is a block diagram of a third example of transmission of the GC-DMRS within the wireless communications system of FIG. 3.

FIG. 8 is a block diagram of a third example of transmission of the GC-DMRS 374 within the wireless communications system 300 of FIG. 3. FIG. 8 depicts a wireless communications system 800 that includes the devices and components of the wireless communications system 300 of FIG. 3. However, one or more operations or messages described with reference to the wireless communications system 800 may differ from operations or messages described with reference to the wireless communications system 300 of FIG. 3. In the example of FIG. 8, information related to the GC-DMRS and the individual PDSCHs may be transmitted to the UEs of the group at least partially using separate PDCCH transmissions to the UEs.

During operation of the wireless communications system 800, the base station 105 may determine a GC-DMRS resource allocation 806 and a PDSCH FDRA 808 for a PDSCH for the UE 115, as described with reference to FIG. 3. For example, the GC-DMRS resource allocation 806 may include or correspond to the GC-DMRS resource allocation 370 of FIG. 3, and the PDSCH FDRA 808 may include or correspond to the PDSCH FDRA 372 of FIG. 3. In some implementations, the UEs may be selected for inclusion in a group for DMRS transmission based on the UEs being associated with (e.g., configured for) a same scramble ID, a same DMRS type, a same PDSCH mapping type, and a same rank. In some implementations, the PDSCH FDRA 808 may be the same as an overall PDSCH FDRA for the group of UEs (e.g., the UEs 115, 340, and 342). In some other implementations, the PDSCH FDRA 808 may be a subset of the overall PDSCH. Alternatively, the PDSCH FDRA 808 may be a non-contiguous allocation of resources of the overall PDSCH FDRA (e.g., such that an interlace value and offset are not needed).

To communicate GC-DMRS-related information and PDSCH FDRA-related information, the base station 105 may transmit a DCI message 804 within a PDCCH 802 to the UE 115. The DCI message 804 may indicate the GC-DMRS resource allocation 806 and the PDSCH FDRA 808. For example, a field of the DCI message 804 may include a bitmap or other indicator that represents the set of RBGs allocated for GC-DMRS transmission, and another field of the DCI message 804 may include a bitmap or other indicator that represents RBs that are allocated to PDSCH transmission. The GC-DMRS resource allocation 806 may indicate the frequency resources (e.g., the set of RBGs) allocated to GC-DMRS transmission, as well as a DMRS pattern used for GC-DMRS transmission (e.g., a fixed pattern or one of a group of DMRS patterns). The PDSCH FDRA 808 may indicate a non-contiguous pattern, or the PDSCH FDRA 808 may indicate an overall PDSCH FDRA, and the DCI message 804 may include an interlace value and an offset, as described with reference to FIGS. 4-7. In some implementations, the DCI message 804 may also indicate a PDSCH MCS 810 associated with PDSCH transmission.

After transmitting the DCI message 804 via the PDCCH 802, the base station 105 may transmit a GC-DMRS 812 and a PDSCH 814 to the UE 115. The GC-DMRS 812 may include or correspond to the GC-DMRS 374 of FIG. 3, and the PDSCH 814 may include or correspond to the PDSCH 376 of FIG. 3. The base station 105 may similarly transmit the DCI messages, the GC-DMRS 812, and individual PDSCHs to the other UEs of the group (e.g., the second UE 340 and the third UE 342). The UE 115 may receive the DCI message 804 via the PDCCH 802 from the base station 105, and the UE 115 may monitor the resources indicated by the GC-DMRS resource allocation 806 to receive the GC-DMRS 812. Additionally, the UE 115 may monitor the resources indicated by the PDSCH FDRA 808 to receive the PDSCH 814. The UE 115 may perform channel estimation based on the GC-DMRS 812 to generate the channel estimate 308 for the wireless channel between the UE 115 and the base station 105. The UE 115 may also demodulate the PDSCH 814 based on the channel estimate 308, such as to receive one or more DL messages from the base station 105. The other UEs of the group may similarly perform channel estimation based on the GC-DMRS 812 and demodulate the individual PDSCHs based on the respective channel estimates.

As described with reference to FIG. 8, the present disclosure provides techniques for sharing the GC-DMRS 812 between a group of UEs (e.g., the UEs 115, 340, and 342) and for allocating individual PDSCH resources according to a non-contiguous pattern. Using the GC-DMRS 812 to perform channel estimation may increase channel estimation gains at the UEs of the group, and allocating individual PDSCH resources according to non-contiguous patterns may increase diversity gains at the UEs of the group. Additionally, indicating the GC-DMRS resource allocation 806 and the PDSCH FDRA 808 in the DCI message 804 may be more flexible than the techniques described with reference to FIGS. 4-7.

Figure 9:
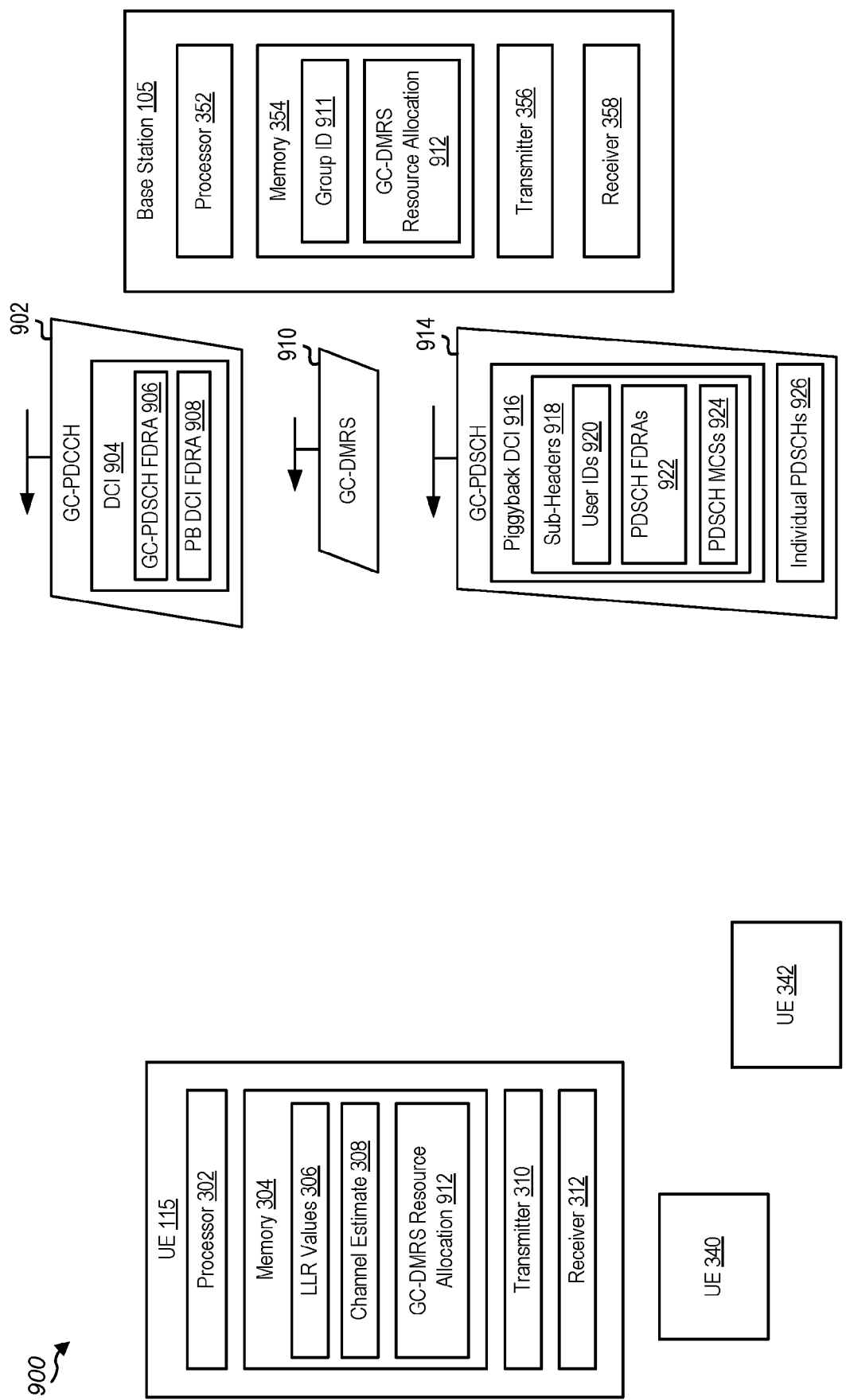
FIG. 9 is a block diagram of a fourth example of transmission of the GC-DMRS within the wireless communications system of FIG. 3.

FIG. 9 is a block diagram of a fourth example of transmission of the GC-DMRS 374 within the wireless communications system 300 of FIG. 3. FIG. 9 depicts a wireless communications system 900 that includes the devices and components of the wireless communications system 300 of FIG. 3. However, one or more operations or messages described with reference to the wireless communications system 900 may differ from operations or messages described with reference to the wireless communications system 300 of FIG. 3. In the example of FIG. 9, information related to the GC-DMRS and the individual PDSCHs may be transmitted to the UEs of the group at least partially using a shared PDCCH and piggyback DCI messages to all of the UEs of the group.

During operation of the wireless communications system 900, the base station 105 may determine a GC-DMRS resource allocation 912 and a GC-PDSCH FDRA 906 for the group of UEs (e.g., the UE 115, the second UE 340, and the third UE 342). For example, the GC-DMRS resource allocation 912 may include or correspond to the GC-DMRS resource allocation 370 of FIG. 3. In some implementations, the UEs may be selected for inclusion in a group for DMRS transmission based on the UEs being associated with (e.g., configured for) a same scramble ID, a same DMRS type, a same PDSCH mapping type, and a same rank. The GC-PDSCH FDRA 906 may include resources allocated for transmission of a GC-PDSCH to the UEs of the group, which may be similar to the overall PDSCH FDRA as described above with reference to FIGS. 4-8. The frequency resources included in the GC-DMRS resource allocation 912 may be the same as, or determinable from, the frequency resources included in the GC-PDSCH FDRA 906.

To communicate GC-PDSCH-related information, the base station 105 may transmit a DCI message 904 within a GC-PDCCH 902 to the UE 115 and the other UEs of the group. In some implementations, the base station 105 may encode the GC-PDCCH 902 based on a group ID 911, and the base station 105 may communicate the group ID 911 to the UEs of the group via RRC messages or other types of messages. In some such implementations, the group ID 911 may be a group radio network temporary identifier (G-RNTI), or a value based on a G-RNTI, such as a hash value. The DCI message 904 may indicate the GC-PDSCH FDRA 906. For example, a field of the DCI message 904 may include a bitmap or other indicator that represents a set of RBGs of a resource BW that are allocated to GC-PDSCH transmissions for the UEs of the group. The DCI message 904 may also indicate a piggyback DCI message FDRA 908.

The piggyback DCI message FDRA 908 may include resources allocated to piggyback DCI message transmission within a GC-PDSCH, which includes a subset of the GC-PDSCH FDRA 906.

After transmitting the DCI message 904 via the GC-PDCCH 902 to the UEs of the group, the base station 105 may transmit a GC-DMRS 910 and a GC-PDSCH 914 to the UE 115 and the other UEs of the group. The GC-DMRS 910 may include or correspond to the GC-DMRS 374 of FIG. 3, and the GC-PDSCH 914 may include or correspond to the PDSCH 376 of FIG. 3. In some implementations, the base station 105 may encode the GC-PDSCH 914 based on the group ID 911, similar to the GC-PDCCH 902. To communicate FDRAs for individual PDSCHs to each of the UEs of the group, the base station 105 may transmit a piggyback DCI message 916 via the GC-PDSCH 914 to the UEs of the group. The piggyback DCI message 916 may be the first message transmitted via the GC-PDSCH 914 (e.g., the piggyback DCI message 916 may be located in the beginning of the GC-PDSCH 914), and the GC-PDSCH 914 may be rate matched based on (e.g., around) the piggyback DCI message 916. After transmitting the piggyback DCI message 916, the base station 105 may transmit individual PDSCHs 926 via the GC-PDSCH 914. The individual PDSCHs 926 may include an individual PDSCH for each UE in the group.

The piggyback DCI message 916 may indicate a respective FDRA for a respective individual PDSCH 926 associated with each UE of the group. For example, the piggyback DCI message 916 may include a header that includes multiple sub-headers 918 that each indicate information associated with an individual PDSCH 926 for a respective UE of the group, such as user IDs 920, PDSCH FDRAs 922, and PDSCH MCSs 924. In some implementations, the header may be polar encoded. The PDSCH FDRAs 922 may include or correspond to the PDSCH FDRA 372 of FIG. 3. To illustrate, each of the sub-headers 918 may include a user ID 920 associated with a respective UE, a PDSCH FDRA 922 for an individual PDSCH 926 associated with the respective UE, and a PDSCH MCS 924 associated with the individual PDSCH 926 associated with the respective UE. In some implementations, the user IDs 920 may be cell radio network temporary identifiers (C-RNTIs) or values based C-RNTIs, such as hash values. In some implementations, each of the PDSCH FDRAs 922 are based on the GC-PDSCH FDRA 906 and are associated with a smaller resource granularity than the GC-PDSCH FDRA 906, as further described with reference to FIG. 10.

In the particular example of FIG. 9, the sub-headers 918 may include a first sub-header associated with the UE 115, a second sub-header associated with the second UE 340, and a third sub-header associated with the third UE 342, each of which include information associated with the respective UE or an individual PDSCH for the respective UE. Each of the sub-headers 918 may have a fixed size (e.g., a fixed number of bits). Additionally or alternatively, the base station 105 may perform QPSK and code rate scaling (based on a code rate scaling factor β) to transmit the piggyback DCI message 916 via the GC-PDSCH 914. In some implementations, the base station 105 may communicate the size of the sub-headers 918, the code rate scaling factor β, or a combination thereof, in RRC messages to each of the UEs of the group, as described with reference to FIG. 6.

The UE 115 may receive the DCI message 904 from the base station 105, and the UE 115 may determine (e.g., infer) the GC-DMRS resource allocation 912 based on the GC-PDSCH FDRA 906. The UE 115 may monitor the resources indicated by the GC-DMRS resource allocation 912 to receive the GC-DMRS 910. The UE 115 may also monitor the resources indicated by the GC-PDSCH FDRA 906 and the piggyback DCI message FDRA 908 to receive the piggyback DCI message 916 via the GC-PDSCH 914. The UE 115 may identify one of the sub-headers 918 that is associated with the UE 115 (e.g., based on one of the user IDs 920), and the UE 115 may monitor the resources indicated by a respective one of the PDSCH FDRAs 922 to receive one of the individual PDSCHs 926 associated with the UE 115. The UE 115 may perform channel estimation based on the GC-DMRS 910 to generate the channel estimate 308 for the wireless channel between the UE 115 and the base station 105. The UE 115 may also demodulate the respective individual PDSCH 926 based on the channel estimate 308, such as to receive one or more DL messages from the base station 105. The other UEs of the group may similarly perform channel estimation based on the GC-DMRS 910, identify respective ones of the sub-headers 918 based on the user IDs 920, and demodulate respective ones of the individual PDSCHs 926 based on the respective channel estimates.

As described with reference to FIG. 9, the present disclosure provides techniques for sharing the GC-DMRS 910 between a group of UEs (e.g., the UEs 115, 340, and 342) and for allocating individual PDSCH resources according to a non-contiguous pattern (e.g., for the individual PDSCHs 926). Using the GC-DMRS 910 to perform channel estimation may increase channel estimation gains at the UEs of the group, and allocating individual PDSCH resources according to non-contiguous patterns may increase diversity gains at the UEs of the group. Additionally, using the GC-PDCCH 902 and the GC-PDSCH 914 to communicate information to all of the UEs of the group may reduce overhead within the wireless communication system 900, as compared to the techniques described with reference to FIGS. 4-8.

Figure 10:
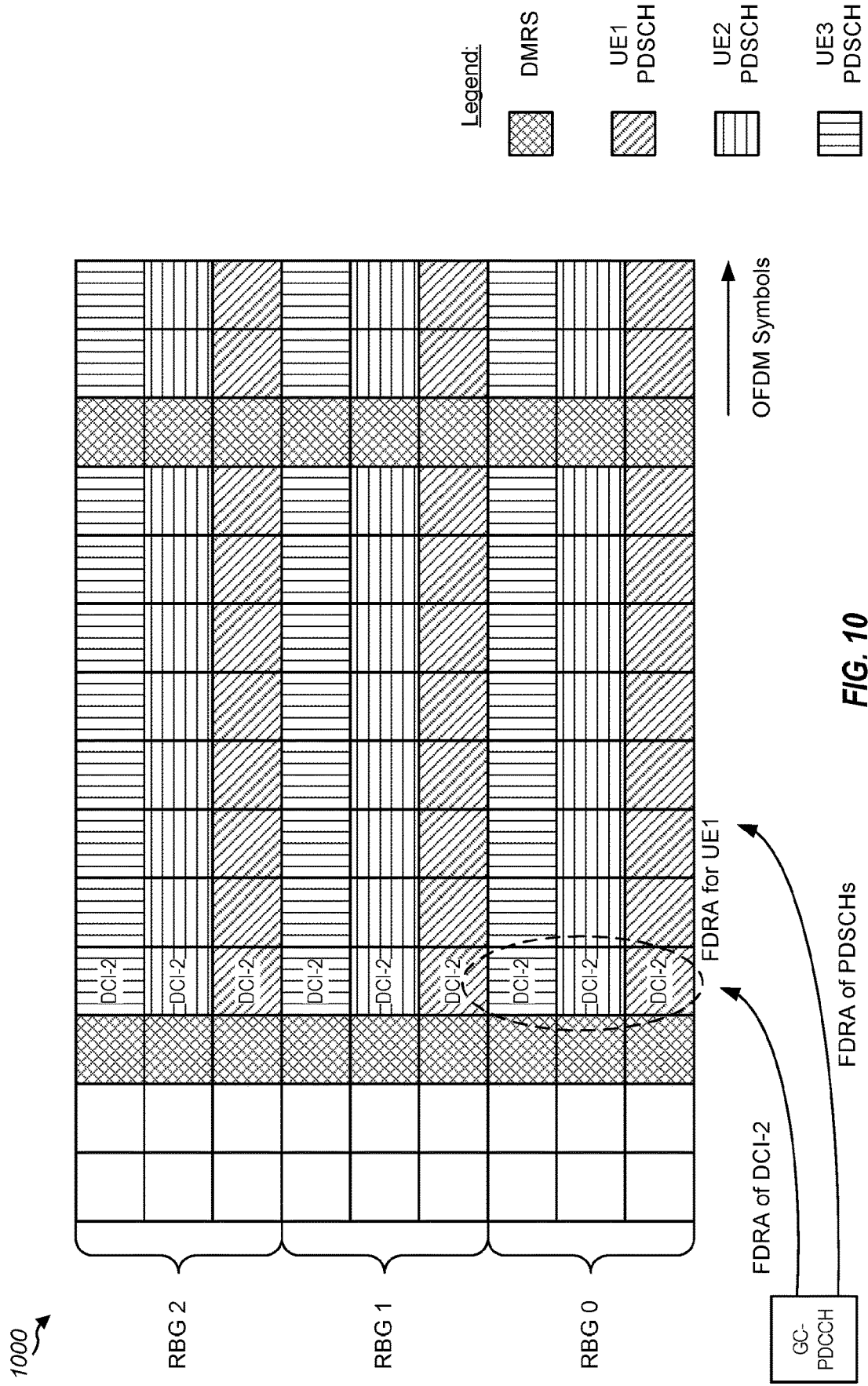
FIG. 10 is a diagram of GC-DMRS and PDSCH allocation performed by the wireless communications system of FIG. 9.

FIG. 10 is a diagram of GC-DMRS and PDSCH allocation performed by the wireless communications system 900 of FIG. 9. FIG. 10 includes a resource diagram 1000 having time resources (e.g., OFDM symbols) in the horizontal/x direction and frequency resources (e.g., RBs) in the vertically direction. As illustrated in FIG. 10, resources may be allocated from a resource BW that includes a set of three RBGs (e.g., RBG 0, RBG 1, and RBG 2) that each include three RBs. In other implementations, the resource BW may include fewer than three or more than three RBGs, and each RBG may include fewer than three or more than three RBs. Additionally, resources may be allocated for sets of fourteen OFDM symbols, as illustrated in FIG. 10, or for sets including fewer than fourteen or more than fourteen OFDM symbols.

In the example of FIG. 10, resources may be allocated according to the GC-DMRS resource allocation 912 and the GC-PDSCH FDRA 906 of FIG. 9. As shown in FIG. 10, the particular resource allocations may be the same as described with reference to FIG. 5. However, as described with reference to FIG. 9, the base station 105 may communicate the GC-PDSCH FDRA 906 and the piggyback DCI message FDRA 908, instead of communicating individual PDSCH FDRAs, interlace values, and offsets. In the example of FIG. 10, the DCI message 904 transmitted via the GC-PDCCH 902 may indicate the GC-PDSCH FDRA 906 (e.g., RBGs 0-2 at the fourth-eleventh, thirteenth, and fourteenth OFDM symbols) and the piggyback DCI message FDRA 908 (e.g., RBGs 0-2 at the third OFDM symbol). To further illustrate, the GC-PDSCH FDRA 906 may be indicated by a bitmap 111, and the piggyback DCI message FDRA 908 may also be indicated by the bitmap 111. Each UE may process the piggyback DCI message 916 transmitted via the GC-PDSCH 914 to determine the respective individual PDSCH FDRAs. For example, the UE 115 may identify a respective sub-header of the piggyback DCI message 916 that indicates an individual PDSCH FDRA (the RB in each RBG that is allocated to an individual PDSCH) for the UE 115. In some implementations, the individual PDSCH FDRAs may be based on the GC-PDSCH FDRA 906 and have smaller granularities. For example, an individual PDSCH FDRA for the UE 115 may be indicated by a bitmap 100100100, an individual PDSCH FDRA for the second UE 340 may be indicated by a bitmap 010010010, and an individual PDSCH FDRA for the third UE 342 may be indicated by a bitmap 001001001.

Figures 11, 12:
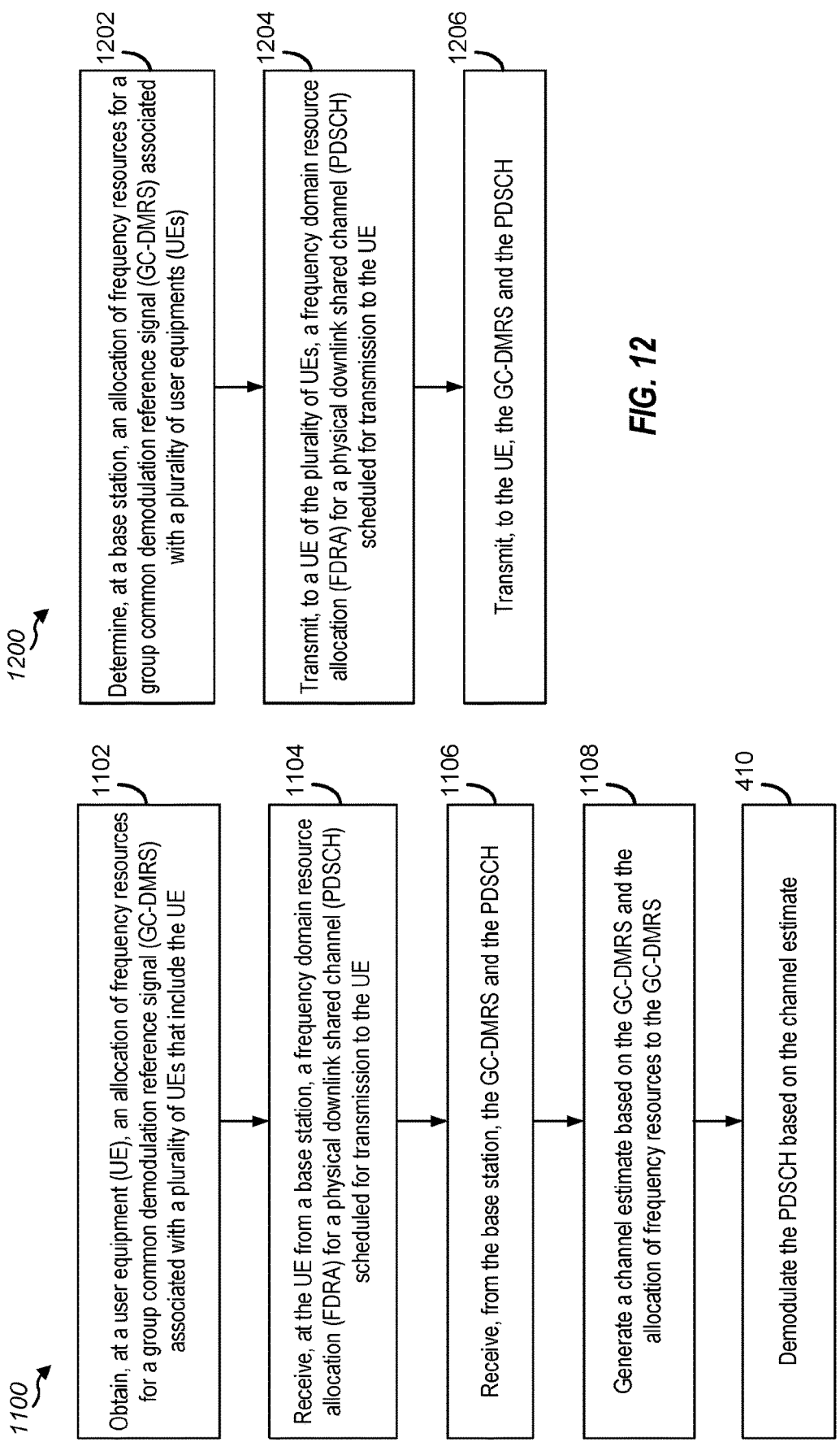
FIG. 11 is a flow diagram illustrating an example process that supports receiving a GC-DMRS at a UE according to some aspects.
FIG. 12 is a flow diagram illustrating an example process that supports transmitting a GC-DMRS from a base station according to some aspects.

FIG. 11 is a flow diagram illustrating an example process 1100 that supports receiving a GC-DMRS at a UE according to some aspects. Operations of the process 1100 may be performed by a UE, such as the UE 115 described above with reference to FIGS. 1-4, 6, 8, and 9 or a UE as described with reference to FIG. 13. For example, example operations (also referred to as "blocks") of the process 1100 may enable the UE 115 to receive a GC-DMRS.

In block 1102, the UE 115 obtains an allocation of frequency resources for a GC-DMRS associated with a plurality of UEs that include the UE 115. For example, the allocation of frequency resources for the GC-DMRS may include or correspond to the GC-DMRS resource allocation 370 of FIG. 3. In block 1104, the UE 115 receives, a base station, a FDRA for a PDSCH scheduled for transmission to the UE 115. For example, the FDRA for the PDSCH may include or correspond to the PDSCH FDRA 372 of FIG. 3.

In block 1106, the UE 115 receives, from the base station, the GC-DMRS and the PDSCH. For example, the GC-DMRS may include or correspond to the GC-DMRS 374, and the PDSCH may include or correspond to the PDSCH 376 of FIG. 3. In block 1108, the UE 115 generates a channel estimate based on the GC-DMRS and the allocation of frequency resources to the GC-DMRS. For example, the channel estimate may include or correspond to the channel estimate 308 of FIG. 3. In block 1110, the UE 115 demodulates the PDSCH based on the channel estimate. For example, the UE 115 may demodulate the PDSCH 376 based on the channel estimate 308 of FIG. 3.

In some implementations, the FDRA for the PDSCH may include a non-contiguous pattern of RBs across a plurality of RBGs of a resource BW, and RBs allocated to the PDSCH may be separated in frequency by one or more RBs allocated to one or more PDSCHs scheduled for transmission to one or more other UEs of the plurality of UEs. In some such implementations, each RBG of the plurality of RBGs may be allocated to the plurality of UEs, and each RB of an RBG may be allocated to a different UE of the plurality of UEs. Additionally or alternatively, demodulating the PDSCH based on the channel estimate may include determining one or more LLR values based on the channel estimate and associated with the FDRA for the PDSCH.

In some implementations, obtaining the allocation of frequency resources for the GC-DMRS may include receiving, from the base station, one or more RRC messages that indicate the allocation of frequency resources for the GC-DMRS. For example, the one or more RRC messages may include or correspond to the RRC messages 402, and the allocation of resources may include or correspond to the GC-DMRS resource allocation 404 of FIG. 4. In some such implementations, the frequency resources for the GC-DMRS may be allocated according to a different pattern than frequency resources for another GC-DMRS associated with another plurality of UEs. Alternatively, the frequency resources for the GC-DMRS may be allocated according to a fixed pattern for multiple DMRSs. Additionally or alternatively, the one or more RRC messages may indicate an interlace value and an offset associated with the UE 115. The offset may represent a RB offset relative to a beginning of a RBG for a RB allocated to the UE 115, and the interlace value may represent a number of RBs between successive RBs allocated to the UE. In some such implementations, receiving the FDRA for the PDSCH may include receiving, from the base station, a PDCCH that includes a DCI message that indicates the FDRA for the PDSCH. For example, the PDCCH may include or correspond to the PDCCH 410, the DCI message may include or correspond to the DCI message 412, and the FDRA may include or correspond to the PDSCH FDRA 414 of FIG. 4. In some such implementations, the FDRA for the PDSCH may indicate one or more RBGs that include RBs allocated to the UE.

In some implementations, obtaining the allocation of frequency resources for the GC-DMRS may include receiving, from the base station, a piggyback DCI message in the PDSCH. The piggyback DCI message may indicate the allocation of frequency resources for the GC-DMRS. For example, the piggyback DCI message may include or correspond to the piggyback DCI message 622, the PDSCH may include or correspond to the PDSCH 620, and the allocation of frequency resources may include or correspond to the GC-DMRS resource allocation 624 of FIG. 6. In some such implementations, the process 1100 may also include receiving, from the base station, one or more RRC messages that indicate a length of the piggyback DCI message, a code rate scaling factor associated with the piggyback DCI message, or a combination thereof. For example, the one or more RRC messages may include or correspond to the RRC messages 602 of FIG. 6. In some such implementations, the one or more RRC messages may further indicate an interlace value and an offset associated with the UE 115. The offset may represent a RB offset relative to a beginning of a RBG for a RB allocated to the UE 115, and the interlace value may represent a number of RBs between successive RBs allocated to the UE. In some such implementations, receiving the FDRA for the PDSCH may include receiving, from the base station, a PDCCH that includes a DCI message that indicates the FDRA for the PDSCH. For example, the PDCCH may include or correspond to the PDCCH 612, the DCI message may include or correspond to the DCI message 614, and the FDRA may include or correspond to the PDSCH FDRA 616 of FIG. 6.

In some implementations, obtaining the allocation of frequency resources for the GC-DMRS and receiving the FDRA for the PDSCH may include receiving, from the base station, a PDCCH that includes a DCI message that indicates the allocation of the frequency resources for the GC-DMRS and the FDRA for the PDSCH. For example, the PDCCH may include or correspond to the PDCCH 802, the DCI message may include or correspond to the DCI message 804, the allocation of frequency resources may include or correspond to the GC-DMRS resource allocation 806, and the FDRA may include or correspond to the PDSCH FDRA 808 of FIG. 8. In some such implementations, the DCI message may further indicate a MCS associated with the PDSCH.

In some implementations, the process 1100 may also include receiving, from the base station, a GC-PDCCH that includes a DCI message that indicates a FDRA for a GC-PDSCH for the plurality of UEs and a FDRA for a piggyback DCI message to be included in the GC-PDSCH. For example, the GC-PDCCH may include or correspond to the GC-PDCCH 902, the DCI message may include or correspond to the DCI message 904, the FDRA for the GC-PDSCH may include or correspond to the GC-PDSCH FDRA 906, and the FDRA for the piggyback DCI message may include or correspond to the piggyback DCI message FDRA 908 of FIG. 9. In some such implementations, the process 1100 may further include receiving, from the base station, a group identifier associated with the plurality of UEs, and decoding the GC-PDCCH based on the group identifier. Additionally or alternatively, obtaining the allocation of frequency resources for the GC-DMRS may include determining the allocation of frequency resources for the GC-DMRS based on the FDRA for the GC-PDSCH. In some such implementations, receiving the FDRA for the PDSCH may include receiving, from the base station, the piggyback DCI message in the GC-PDSCH. The piggyback DCI message may indicate a respective FDRA for a respective PDSCH associated with each UE of the plurality of UEs. For example, GC-PDSCH may include or correspond to the GC-PDSCH 914, and the piggyback DCI message may include or correspond to the piggyback DCI message 916 of FIG. 9. In some such implementations, the GC-PDSCH may be rate matched based on the piggyback DCI message. Additionally or alternatively, the piggyback DCI message may include a plurality of sub-headers associated with the plurality of UEs. A sub-header of the plurality of sub-headers associated with the UE 115 may include a user identifier associated with the UE 115, and the sub-header may indicate the FDRA for the PDSCH and a MCS associated with the PDSCH. In some such implementations, the FDRA for the PDSCH may be based on the FDRA for the GC-PDSCH and may be associated with a smaller granularity than the FDRA for the GC-PDSCH. Additionally or alternatively, the process 1100 may further include receiving, from the base station, one or more RRC messages that indicate a length of each sub-header of the plurality of sub-headers, a code rate scaling factor associated with the piggyback DCI message, or a combination thereof.

FIG. 12 is a flow diagram illustrating an example process 1200 that supports transmitting a GC-DMRS from a base station according to some aspects. Operations of the process 1200 may be performed by a base station, such as the base station 105 described above with reference to FIGS. 1-4, 6, 8, and 9 or a base station as described with reference to FIG. 14. For example, example operations of the process 1200 may enable the base station 105 to transmit a GC-DMRS.

In block 1202, the base station 105 determines an allocation of frequency resources for a GC-DMRS associated with a plurality of UEs. For example, the allocation of frequency resources may include or correspond to the GC-DMRS resource allocation 370 of FIG. 3. In block 1204, the base station 105 transmits, to a UE of the plurality of UEs, a FDRA for a PDSCH scheduled for transmission to the UE. For example, the FDRA may include or correspond to the PDSCH FDRA 372 of FIG. 3. In block 1206, the base station 105 transmits, to the UE, the GC-DMRS and the PDSCH. For example, the GC-DMRS may include or correspond to the GC-DMRS 374, and the PDSCH may include or correspond to the PDSCH 376 of FIG. 3.

In some implementations, the FDRA for the PDSCH may include a non-contiguous pattern of RBs across a plurality of RBGs of a resource BW, and RBs allocated to the PDSCH may be separated in frequency by one or more RBs allocated to one or more PDSCHs scheduled for transmission to one or more other UEs of the plurality of UEs. In some such implementations, each RBG of the plurality of RBGs may be allocated to the plurality of UEs, and each RB of an RBG may be allocated to a different UE of the plurality of UEs.

In some implementations, the process 1200 may also include transmitting, to the UE, one or more RRC messages that indicate the allocation of frequency resources for the GC-DMRS. For example, the one or more RRC messages may include or correspond to the RRC messages 402, and the allocation of frequency resources may include or correspond to the GC-DMRS resource allocation 404 of FIG. 4. In some such implementations, the frequency resources for the GC-DMRS may be allocated according to a different pattern than frequency resources for another GC-DMRS associated with another plurality of UEs. Alternatively, the frequency resources for the GC-DMRS may be allocated according to a fixed pattern for multiple DMRSs. Additionally or alternatively, the one or more RRC messages may indicate an interlace value and an offset associated with the UE. The offset may represent a RB offset relative to a beginning of a RBG for a RB allocated to the UE, and the interlace value may represent a number of RBs between successive RBs allocated to the UE. In some such implementations, transmitting the FDRA for the PDSCH may include transmitting, to the UE, a PDCCH that includes a DCI message that indicates the FDRA for the PDSCH. For example, the PDCCH may include or correspond to the PDCCH 410, the DCI message may include or correspond to the DCI message 412, and the FDRA may include or correspond to the PDSCH FDRA 414 of FIG. 4. In some such implementations, the FDRA for the PDSCH may indicate one or more RBGs that include RBs allocated to the UE.

In some implementations, the process 1200 may also include transmitting, to the UE, a piggyback DCI message in the PDSCH. The piggyback DCI message may indicate the allocation of frequency resources for the GC-DMRS. For example, the piggyback DCI message may include or correspond to the piggyback DCI message 622, the PDSCH may include or correspond to the PDSCH 620, and the allocation of frequency resources may include or correspond to the GC-DMRS resource allocation 624 of FIG. 6. In some such implementations, the process 1200 may further include transmitting, to the UE, one or more RRC messages that indicate a length of the piggyback DCI message, a code rate scaling factor associated with the piggyback DCI message, or a combination thereof. For example, the one or more RRC messages may include or correspond to the RRC messages 602. In some such implementations, the one or more RRC messages may further indicate an interlace value and an offset associated with the UE. The offset may represent a RB offset relative to a beginning of a RBG for a RB allocated to the UE, and the interlace value may represent a number of RBs between successive RBs allocated to the UE. In some such implementations, transmitting the FDRA for the PDSCH may include transmitting, to the UE, a PDCCH that includes a DCI message that indicates the FDRA for the PDSCH. For example, the PDCCH may include or correspond to the PDCCH 612, the DCI message may include or correspond to the DCI message 614, and the FDRA may include or correspond to the PDSCH FDRA 616 of FIG. 6.

In some implementations, transmitting the FDRA for the PDSCH may include transmitting, to the UE, a PDCCH that includes a DCI message that indicates the allocation of the frequency resources for the GC-DMRS and the FDRA for the PDSCH. For example, the PDCCH may include or correspond to the PDCCH 802, the DCI message may include or correspond to the DCI message 804, the allocation of frequency resources may include or correspond to the GC-DMRS resource allocation 806, and the FDRA may include or correspond to the PDSCH FDRA 808 of FIG. 8. In some such implementations, the DCI message may further indicate a MCS associated with the PDSCH.

In some implementations, the process 1200 may also include transmitting, to the plurality of UEs, a GC-PDCCH that includes a DCI message that indicates a FDRA for a GC-PDSCH for the plurality of UEs and a FDRA for a piggyback DCI message to be included in the GC-PDSCH. For example, the GC-PDCCH may include or correspond to the GC-PDCCH 902, and the DCI message may include or correspond to the DCI message 904 of FIG. 9. In some such implementations, the process 1200 may further include transmitting, to the UE, a group identifier associated with the plurality of UEs. Additionally or alternatively, transmitting the FDRA for the PDSCH may include transmitting, to the UE, the piggyback DCI message in the GC-PDSCH. The piggyback DCI message may indicate a respective FDRA for a respective PDSCH associated with each UE of the plurality of UEs. For example, the GC-PDSCH may include or correspond to the GC-PDSCH 914, and the piggyback DCI message may include or correspond to the piggyback DCI message 916 of FIG. 9. In some such implementations, the process 1200 may also include rate matching the GC-PDSCH based on the piggyback DCI message. Additionally or alternatively, the piggyback DCI message may include a plurality of sub-headers associated with the plurality of UEs. A sub-header of the plurality of sub-headers associated with the UE may include a user identifier associated with the UE, and the sub-header may indicate the FDRA for the PDSCH and a MCS associated with the PDSCH. In some such implementations, the FDRA for the PDSCH may be based on the FDRA for the GC-PDSCH and may be associated with a smaller granularity than the FDRA for the GC-PDSCH. Additionally or alternatively, the process 1200 may further include transmitting, to the UE, one or more RRC messages that indicate a length of each sub-header of the plurality of sub-headers, a code rate scaling factor associated with the piggyback DCI message, or a combination thereof.

Figure 13:
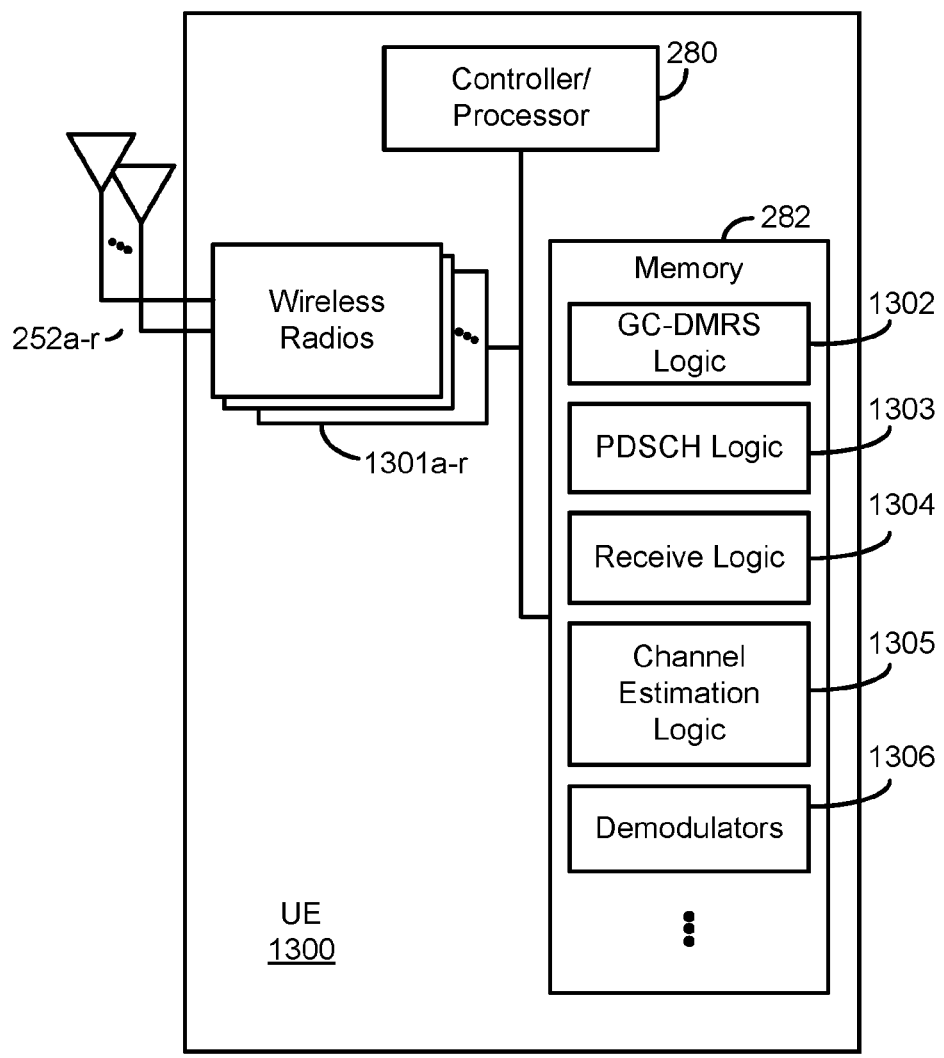
FIG. 13 is a block diagram of an example UE that supports receiving a GC-DMRS according to some aspects.

FIG. 13 is a block diagram of an example UE 1300 that supports receiving a GC-DMRS according to some aspects. The UE 1300 may be configured to perform operations, including the blocks of the process 1100 described with reference to FIG. 11. In some implementations, the UE 1300 includes the structure, hardware, and components shown and described with reference to the UE 115 of FIG. 2-4, 6, 8, or 9. For example, the UE 1300 includes the controller/processor 280, which operates to execute logic or computer instructions stored in the memory 282, as well as controlling the components of the UE 1300 that provide the features and functionality of the UE 1300. The UE 1300, under control of the controller/processor 280, transmits and receives signals via wireless radios 1301a-r and the antennas 252a-r. The wireless radios 1301a-r include various components and hardware, as illustrated in FIG. 2 for the UE 115, including the modulator and demodulators 254a-r, the MIMO detector 256, the receive processor 258, the transmit processor 264, and the TX MIMO processor 266.

As shown, the memory 282 may include GC-DMRS logic 1302, PDSCH logic 1303, receive logic 1304, channel estimation logic 1305, and one or more demodulators 1306. The GC-DMRS logic 1302 may be configured to obtain an allocation of frequency resources for a GC-DMRS and to enable receipt and processing of the GC-DMRS. The PDSCH logic 1303 may be configured to obtain a FDRA for a PDSCH and to enable receipt and processing of the PDSCH. The receive logic 1304 may be configured to enable receipt of signals or messages via the wireless radios 1301a-r and the antennas 252a-r. The channel estimation logic 1305 may be configured to generate a channel estimate based on a GC-DMRS. The demodulators may be configured to demodulate signals, such as the PDSCH based on the channel estimate. The UE 1300 may receive signals from or transmit signals to one or more network entities, such as the base station 105 of FIGS. 1-4, 6, 8, and 9 or a base station as illustrated in FIG. 14.

In some implementations, the UE 1300 may be configured to perform the process 1100 of FIG. 11. To illustrate, the UE 1300 may execute, under control of the controller/processor 280, the GC-DMRS logic 1302, the PDSCH logic 1303, the receive logic 1304, the channel estimation logic 1305, and the demodulators 1306 stored in the memory 282. The execution environment of the GC-DMRS logic 1302, and optionally the receive logic 1304, provides the functionality to perform at least the operations in block 1102. The execution environment of the PDSCH logic 1303 and the receive logic 1304 provides the functionality to perform at least the operations in block 1104. The execution environment of the GC-DMRS logic 1302, the PDSCH logic 1303, and the receive logic 1304 provides the functionality to perform at least the operations in block 1106. The execution environment of the channel estimation logic 1305 provides the functionality to perform at least the operations in block 1108. The demodulators 1306 and the execution environment of the GC-DMRS logic 1302 provides the functionality to perform at least the operations in block 1110.

Figure 14:
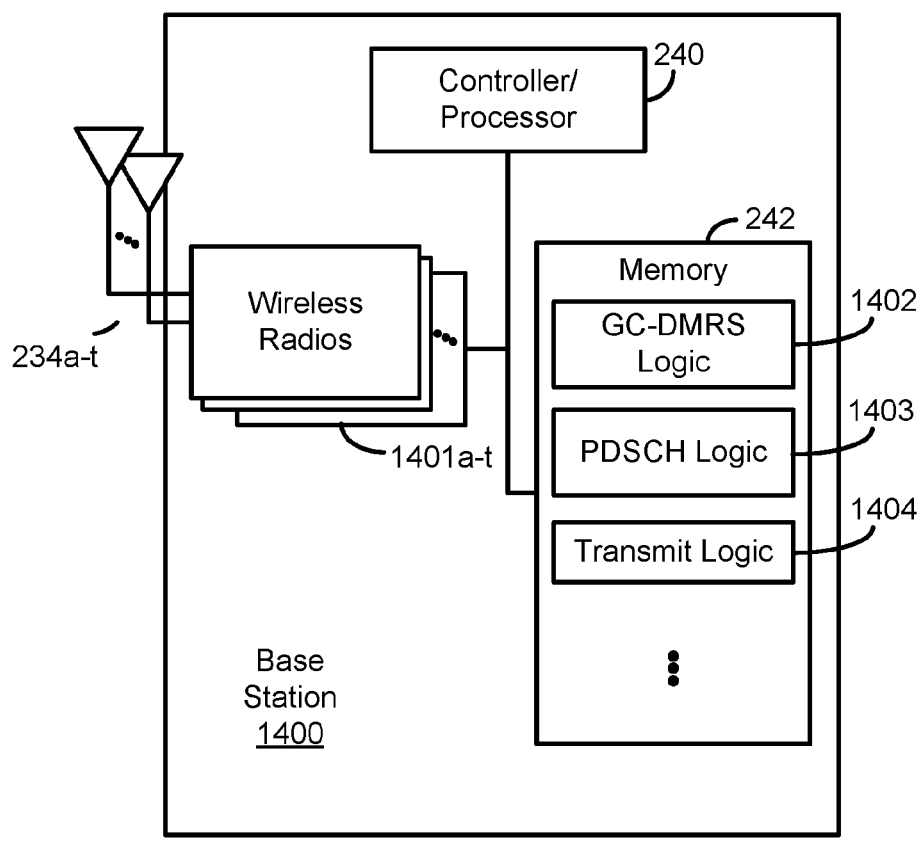
FIG. 14 is a block diagram of an example base station that supports transmitting a GC-DMRS according to some aspects.

FIG. 14 is a block diagram of an example base station 1400 that supports transmitting a GC-DMRS according to some aspects. The base station 1400 may be configured to perform operations, including the blocks of the process 1200 described with reference to FIG. 12. In some implementations, the base station 1400 includes the structure, hardware, and components shown and described with reference to the base station 105 of FIG. 1-4, 6, 8, or 9. For example, the base station 1400 may include the controller/processor 240, which operates to execute logic or computer instructions stored in the memory 242, as well as controlling the components of the base station 1400 that provide the features and functionality of the base station 1400. The base station 1400, under control of the controller/processor 240, transmits and receives signals via wireless radios 1401a-t and the antennas 234a-t. The wireless radios 1401a-t include various components and hardware, as illustrated in FIG. 2 for the base station 105, including the modulator and demodulators 232a-t, the transmit processor 220, the TX MIMO processor 230, the MIMO detector 236, and the receive processor 238.

As shown, the memory 242 may include GC-DMRS logic 1402, PDSCH logic 1403, and transmit logic 1404. The GC-DMRS logic 1402 may be configured to allocate resources to a GC-DMRS and generate the GC-DMRS. The PDSCH logic 1403 may be configured to allocate resources to a PDSCH and to generate a PDSCH. The transmit logic 1404 may be configured to enable transmission of signals and messages via the wireless radios 1401a-t and the antennas 234a-t. The base station 1400 may receive signals from or transmit signals to one or more UEs, such as the UE 115 of FIGS. 1-4, 6, 8, and 9 or the UE 1300 of FIG. 13.

In some implementations, the base station 1400 may be configured to perform the process 1200 of FIG. 12. To illustrate, the base station 1400 may execute, under control of the controller/processor 240, the GC-DMRS logic 1402, the PDSCH logic 1403, and the transmit logic 1404 stored in the memory 242. The execution environment of the GC-DMRS logic 1402 provides the functionality to perform at least the operations in block 1202. The execution environment of the PDSCH logic 1403 and the transmit logic 1404 provides the functionality to perform at least the operations in block 1204. The execution environment of the GC-DMRS logic 1402, the PDSCH logic 1403, and the transmit logic 1404 provides the functionality to perform at least the operations in block 1206.

It is noted that one or more blocks (or operations) described with reference to FIGS. 11 and 12 may be combined with one or more blocks (or operations) described with reference to another of the figures. For example, one or more blocks (or operations) of FIG. 11 may be combined with one or more blocks (or operations) of FIG. 12. As another example, one or more blocks associated with FIG. 13 or 14 may be combined with one or more blocks (or operations) associated with FIG. 2-4, 6, 8, or 9.

In some aspects, techniques for enabling GC-DMRSs for multiple UEs may include additional aspects, such as any single aspect or any combination of aspects described below or in connection with one or more other processes or devices described elsewhere herein. In some aspects, enabling GC-DMRSs for multiple UEs may include an apparatus configured to obtain an allocation of frequency resources for a GC-DMRS associated with a plurality of UEs. The apparatus is also configured to receive, from a base station, a FDRA for a PDSCH scheduled for transmission to the apparatus. The apparatus is configured to receive, from the base station, the GC-DMRS and the PDSCH. The apparatus is also configured to generate a channel estimate based on the GC-DMRS and the allocation of frequency resources to the GC-DMRS. The apparatus is further configured to demodulate the PDSCH based on the channel estimate. In some implementations, the apparatus includes a wireless device, such as a UE. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a first aspect, the FDRA for the PDSCH includes a non-contiguous pattern of RBs across a plurality of RBGs of a resource BW. RBs allocated to the PDSCH are separated in frequency by one or more RBs allocated to one or more PDSCHs scheduled for transmission to one or more other UEs of the plurality of UEs.

In a second aspect, in combination with the first aspect, each RBG of the plurality of RBGs is allocated to the plurality of UEs. Each RB of an RBG is allocated to a different UE of the plurality of UEs.

In a third aspect, alone or in combination with one or more of the first through second aspects, demodulating the PDSCH based on the channel estimate includes determining one or more LLR values based on the channel estimate and associated with the FDRA for the PDSCH.

In a fourth aspect, alone or in combination with one or more of the first through third aspects, obtaining the allocation of frequency resources for the GC-DMRS includes receiving, from the base station, one or more RRC messages that indicate the allocation of frequency resources for the GC-DMRS.

In a fifth aspect, in combination with the fourth aspect, the frequency resources for the GC-DMRS are allocated according to a different pattern than frequency resources for another GC-DMRS associated with another plurality of UEs.

In a sixth aspect, in combination with the fourth aspect, the frequency resources for the GC-DMRS are allocated according to a fixed pattern for multiple DMRSs.

In a seventh aspect, in combination with one or more of the fourth through sixth aspects, the one or more RRC messages indicate an interlace value and an offset associated with the UE. The offset represents a RB offset relative to a beginning of a RBG for a RB allocated to the UE. The interlace value represents a number of RBs between successive RBs allocated to the UE.

In an eighth aspect, in combination with the seventh aspect, receiving the FDRA for the PDSCH includes receiving, from the base station, a PDCCH that includes a DCI message that indicates the FDRA for the PDSCH.

In a ninth aspect, in combination with the eighth aspect, the FDRA for the PDSCH indicates one or more RBGs that include RBs allocated to the UE.

In a tenth aspect, alone or in combination with one or more of the first through third aspects, obtaining the allocation of frequency resources for the GC-DMRS includes receiving, from the base station, a piggyback DCI message in the PDSCH. The piggyback DCI message indicates the allocation of frequency resources for the GC-DMRS.

In an eleventh aspect, in combination with the tenth aspect, the apparatus is configured to receive, from the base station, one or more RRC messages that indicate a length of the piggyback DCI message, a code rate scaling factor associated with the piggyback DCI message, or a combination thereof.

In a twelfth aspect, in combination with the eleventh aspect, the one or more RRC messages further indicate an interlace value and an offset associated with the apparatus. The offset represents a RB offset relative to a beginning of a RBG for a RB allocated to the apparatus. The interlace value represents a number of RBs between successive RBs allocated to the apparatus.

In a thirteenth aspect, in combination with the twelfth aspect, receiving the FDRA for the PDSCH includes receiving, from the base station, a PDCCH that includes a DCI message that indicates the FDRA for the PDSCH.

In a fourteenth aspect, alone or in combination with one or more of the first through third aspects, obtaining the allocation of frequency resources for the GC-DMRS and receiving the FDRA for the PDSCH includes receiving, from the base station, a PDCCH that includes a DCI message that indicates the allocation of the frequency resources for the GC-DMRS and the FDRA for the PDSCH.

In a fifteenth aspect, in combination with the fourteenth aspect, the DCI message further indicates a MCS associated with the PDSCH.

In a sixteenth aspect, alone or in combination with one or more of the first through third aspects, the apparatus is configured to receive, from the base station, a GC-PDCCH that includes a DCI message that indicates a FDRA for a GC-PDSCH for the plurality of UEs and a FDRA for a piggyback DCI message to be included in the GC-PDSCH.

In a seventeenth aspect, in combination with the sixteenth aspect, the apparatus is configured to receive, from the base station, a group identifier associated with the plurality of UE.

In an eighteenth aspect, in combination with the seventeenth aspect, the apparatus is configured to decode the GC-PDCCH based on the group identifier.

In a nineteenth aspect, in combination with the eighteenth aspect, obtaining the allocation of frequency resources for the GC-DMRS includes determining the allocation of frequency resources for the GC-DMRS based on the FDRA for the GC-PDSCH.

In a twentieth aspect, in combination with the nineteenth aspect, receiving the FDRA for the PDSCH includes receiving, from the base station, the piggyback DCI message in the GC-PDSCH. The piggyback DCI message indicates a respective FDRA for a respective PDSCH associated with each UE of the plurality of UEs.

In a twenty-first aspect, in combination with the twentieth aspect, the GC-PDSCH is rate matched based on the piggyback DCI message.

In a twenty-second aspect, in combination with one or more of the twentieth through twenty-first aspects, the piggyback DCI message includes a plurality of sub-headers associated with the plurality of UEs. A sub-header of the plurality of sub-headers associated with the apparatus includes a user identifier associated with the apparatus. The sub-header indicates the FDRA for the PDSCH and a MCS associated with the PDSCH.

In a twenty-third aspect, in combination with the twenty-second aspect, the FDRA for the PDSCH is based on the FDRA for the GC-PDSCH and is associated with a smaller granularity than the FDRA for the GC-PDSCH.

In a twenty-fourth aspect, in combination with one or more of the twenty-second through twenty-third aspects, the apparatus is configured to receive, from the base station, one or more RRC messages that indicate a length of each sub-header of the plurality of sub-headers, a code rate scaling factor associated with the piggyback DCI message, or a combination thereof.

In some aspects, an apparatus configured for wireless communication, such as a base station, is configured to determine an allocation of frequency resources for a GC-DMRS associated with a plurality of UEs. The apparatus is also configured to transmit, to a UE of the plurality of UEs, a FDRA for a PDSCH scheduled for transmission to the UE. The apparatus is further configured to transmit, to the UE, the GC-DMRS and the PDSCH. In some implementations, the apparatus includes a wireless device, such as a base station. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a twenty-fifth aspect, the FDRA for the PDSCH includes a non-contiguous pattern of RBs across a plurality of RBGs of a resource bandwidth. RBs allocated to the PDSCH are separated in frequency by one or more RBs allocated to one or more PDSCHs scheduled for transmission to one or more other UEs of the plurality of UEs.

In a twenty-sixth aspect, in combination with the twenty-fifth aspect, each RBG of the plurality of RBGs is allocated to the plurality of UEs. Each RB of an RBG is allocated to a different UE of the plurality of UEs.

In a twenty-seventh aspect, alone or in combination with one or more of the twenty-fifth through twenty-sixth aspects, the apparatus is configured to transmit, to the UE, one or more RRC messages that indicate the allocation of frequency resources for the GC-DMRS.

In a twenty-eighth aspect, in combination with the twenty-seventh aspect, the frequency resources for the GC-DMRS are allocated according to a different pattern than frequency resources for another GC-DMRS associated with another plurality of UEs.

In a twenty-ninth aspect, in combination with the twenty-seventh aspect, the frequency resources for the GC-DMRS are allocated according to a fixed pattern for multiple DMRSs.

In a thirtieth aspect, in combination with one or more of the twenty-seventh through twenty-ninth aspects, the one or more RRC messages indicate an interlace value and an offset associated with the UE. The offset represents a RB offset relative to a beginning of a RBG for a RB allocated to the UE. The interlace value represents a number of RBs between successive RBs allocated to the UE.

In a thirty-first aspect, in combination with the thirtieth aspect, transmitting the FDRA for the PDSCH includes transmitting, to the UE, a PDCCH that includes a DCI message that indicates the FDRA for the PDSCH.

In a thirty-second aspect, in combination with the thirty-first aspect, the FDRA for the PDSCH indicates one or more RBGs that include RBs allocated to the UE.

In a thirty-third aspect, alone or in combination with one or more of the twenty-fifth through twenty-sixth aspects, the apparatus is configured to transmit, to the UE, a piggyback DCI message in the PDSCH. The piggyback DCI message indicates the allocation of frequency resources for the GC-DMRS.

In a thirty-fourth aspect, in combination with the thirty-third aspect, the apparatus is configured to transmit, to the UE, one or more RRC messages that indicate a length of the piggyback DCI message, a code rate scaling factor associated with the piggyback DCI message, or a combination thereof.

In a thirty-fifth aspect, in combination with the thirty-fourth aspect, the one or more RRC messages further indicate an interlace value and an offset associated with the UE. The offset represents a RB offset relative to a beginning of a RBG for a RB allocated to the UE. The interlace value represents a number of RBs between successive RBs allocated to the UE.

In a thirty-sixth aspect, in combination with the thirty-fifth aspect, transmitting the FDRA for the PDSCH includes transmitting, to the UE, a PDCCH that includes a DCI message that indicates the FDRA for the PDSCH.

In a thirty-seventh aspect, alone or in combination with one or more of the twenty-fifth through twenty-sixth aspects, transmitting the FDRA for the PDSCH includes transmitting, to the UE, a PDCCH that includes a DCI message that indicates the allocation of the frequency resources for the GC-DMRS and the FDRA for the PDSCH.

In a thirty-eighth aspect, in combination with the thirty-seventh aspect, the DCI message further indicates a MCS associated with the PDSCH.

In a thirty-ninth aspect, alone or in combination with one or more of the twenty-fifth through twenty-sixth aspects, the apparatus is configured to transmit, to the plurality of UEs, a GC-PDCCH that includes a DCI message that indicates a FDRA for a GC-PDSCH for the plurality of UEs and a FDRA for a piggyback DCI message to be included in the GC-PDSCH.

In a fortieth aspect, in combination with the thirty-ninth aspect, the apparatus is configured to transmit, to the UE, a group identifier associated with the plurality of UEs.

In a forty-first aspect, in combination with one or more of the thirty-ninth through fortieth aspects, transmitting the FDRA for the PDSCH includes transmitting, to the UE, the piggyback DCI message in the GC-PDSCH. The piggyback DCI message indicates a respective FDRA for a respective PDSCH associated with each UE of the plurality of UEs.

In a forty-second aspect, in combination with the forty-first aspect, the apparatus is configured to rate match the GC-PDSCH based on the piggyback DCI message.

In a forty-third aspect, in combination with one or more of the forty-first through forty-second aspects, the piggyback DCI message includes a plurality of sub-headers associated with the plurality of UEs. A sub-header of the plurality of sub-headers associated with the UE includes a user identifier associated with the UE. The sub-header indicates the FDRA for the PDSCH and a MCS associated with the PDSCH.

In a forty-fourth aspect, in combination with the forty-third aspect, the FDRA for the PDSCH is based on the FDRA for the GC-PDSCH and is associated with a smaller granularity than the FDRA for the GC-PDSCH.

In a forty-fifth aspect, in combination with one or more of the forty-third through forty-fourth aspects, the apparatus is configured to transmit, to the UE, one or more RRC messages that indicate a length of each sub-header of the plurality of sub-headers, a code rate scaling factor associated with the piggyback DCI message, or a combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks and modules described herein (e.g., the functional blocks and modules in FIG. 2) may comprise processors, electronics devices, hardware devices, electronics components, logical circuits, memories, software codes, firmware codes, etc., or any combination thereof. In addition, features discussed herein relating to FIGS. 1-14 may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 11 and 12) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that may be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items may be employed by itself, or any combination of two or more of the listed items may be employed. For example, if a composition is described as containing components A, B, and/or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, the method comprising:
   obtaining, at a user equipment (UE), an allocation of frequency resources for a group common demodulation reference signal (GC-DMRS) associated with a plurality of UEs that include the UE;
   receiving, at the UE from a base station, a frequency domain resource allocation (FDRA) for a physical downlink shared channel (PDSCH) scheduled for transmission to the UE, the FDRA associated with a pattern indicating resources allocated to each of the UEs of the plurality of UEs associated with the GC-DMRS;
   receiving, from the base station, the GC-DMRS and the PDSCH;
   generating a channel estimate based on the GC-DMRS and the allocation of frequency resources to the GC-DMRS; and
   demodulating the PDSCH based on the channel estimate.

2. The method of claim 1, wherein the pattern comprises a non-contiguous pattern of resource blocks (RBs) across plurality of resource block groups (RBGs) of a resource bandwidth, and wherein RBs allocated to the PDSCH are separated in frequency by one or more RBs allocated to one or more PDSCHs scheduled for transmission to one or more other UEs of the plurality of UEs.

3. The method of claim 2, wherein each RBG of the plurality of RBGs is allocated to the plurality of UEs, and wherein each RB of an RBG is allocated to a different UE of the plurality of UEs.

4. The method of claim 1, wherein obtaining the allocation of frequency resources for the GC-DMRS comprises receiving, from the base station, one or more radio resource control (RRC) messages that indicate the allocation of frequency resources for the GC-DMRS.

5. The method of claim 4, wherein the frequency resources for the GC-DMRS are allocated according to a different pattern than frequency resources for another GC-DMRS associated with another plurality of UEs.

6. The method of claim 4, wherein the frequency resources for the GC-DMRS are allocated according to a fixed pattern for multiple DMRSs.

7. The method of claim 4, wherein the one or more RRC messages indicate an interlace value and an offset associated with the UE, wherein the offset represents a resource block (RB) offset relative to a beginning of a resource block group (RBG) for a RB allocated to the UE, and wherein the interlace value represents a number of RBs between successive RBs allocated to the UE.

8. The method of claim 7, wherein receiving the FDRA for the PDSCH comprises receiving, from the base station, a physical downlink control channel (PDCCH) that includes a downlink control information (DCI) message that indicates the FDRA for the PDSCH, and wherein the FDRA for the PDSCH indicates one or more RBGs that include RBs allocated to the UE.

9. An apparatus configured for wireless communication, the apparatus comprising:
   at least one processor; and
   a memory coupled to the at least one processor, wherein the at least one processor is configured to:
      obtain, an allocation of frequency resources for a group common demodulation reference signal (GC-DMRS) associated with a plurality of UEs;
      receive, from a base station, a frequency domain resource allocation (FDRA) for a physical downlink shared channel (PDSCH) scheduled for transmission, the FDRA associated with a pattern indicating resources allocated to each of the UEs of the plurality of UEs associated with the GC-DMRS;
      receive, from the base station, the GC-DMRS and the PDSCH;
      generate a channel estimate based on the GC-DMRS and the allocation of frequency resources to the GC-DMRS; and
      demodulate the PDSCH based on the channel estimate.

10. The apparatus of claim 9, wherein obtaining the allocation of frequency resources for the GC-DMRS comprises receiving, from the base station, a piggyback downlink control information (DCI) message in the PDSCH, the piggyback DCI message indicating the allocation of frequency resources for the GC-DMRS, and wherein the at least one processor is further configured to receive, from the base station, one or more radio resource control (RRC) messages that indicate a length of the piggyback DCI message, a code rate scaling factor associated with the piggyback DCI message, or a combination thereof.

11. The apparatus of claim 10, wherein the one or more RRC messages further indicate an interlace value and an offset associated with the apparatus, wherein the offset represents a resource block (RB) offset relative to a beginning of a resource block group (RBG) for a RB allocated to the apparatus, wherein the interlace value represents a number of RBs between successive RBs allocated to the apparatus, and wherein receiving the FDRA for the PDSCH comprises receiving, from the base station, a physical downlink control channel (PDCCH) that includes a downlink control information (DCI) message that indicates the FDRA for the PDSCH.

12. The apparatus of claim 9, wherein the at least one processor is further configured to receive, from the base station, a group common physical downlink control channel (GC-PDCCH) that includes a downlink control information (DCI) message that indicates a FDRA for a group common PDSCH (GC-PDSCH) for the plurality of UEs and a FDRA for a piggyback downlink control information (DCI) message to be included in the GC-PDSCH.

13. The apparatus of claim 12, wherein the at least one processor is further configured to:
   receive, from the base station, a group identifier associated with the plurality of UEs; and
   decode the GC-PDCCH based on the group identifier.

14. The apparatus of claim 12, wherein obtaining the allocation of frequency resources for the GC-DMRS comprises determining the allocation of frequency resources for the GC-DMRS based on the FDRA for the GC-PDSCH, and wherein receiving the FDRA for the PDSCH comprises receiving, from the base station, the piggyback DCI message in the GC-PDSCH, the piggyback DCI message indicating a respective FDRA for a respective PDSCH associated with each UE of the plurality of UEs.

15. The apparatus of claim 14, wherein the piggyback DCI message includes a plurality of sub-headers associated with the plurality of UEs, wherein a sub-header of the plurality of sub-headers associated with the UE includes a user identifier associated with the UE, wherein the sub-header indicates the FDRA for the PDSCH and a modulation and coding scheme (MCS) associated with the PDSCH, and wherein the at least one processor is further configured to receive, from the base station, one or more radio resource control (RRC) messages that indicate a length of each sub-header of the plurality of sub-headers, a code rate scaling factor associated with the piggyback DCI message, or a combination thereof.

16. A method of wireless communication, the method comprising:
   determining, at a base station, an allocation of frequency resources for a group common demodulation reference signal (GC-DMRS) associated with a plurality of user equipments (UEs);
   transmitting, to a UE of the plurality of UEs, a frequency domain resource allocation (FDRA) for a physical downlink shared channel (PDSCH) scheduled for transmission to the UE, the FDRA associated with a pattern indicating resources allocated to each of the UEs of the plurality of UEs associated with the GC-DMRS; and
   transmitting, to the UE, the GC-DMRS and the PDSCH.

17. The method of claim 16, wherein the pattern comprises a non-contiguous pattern of resource blocks (RBs) across a plurality of resource block groups (RBGs) of a resource bandwidth, and wherein RBs allocated to the PDSCH are separated in frequency by one or more RBs allocated to one or more PDSCHs scheduled for transmission to one or more other UEs of the plurality of UEs.

18. The method of claim 17, wherein each RBG of the plurality of RBGs is allocated to the plurality of UEs, and wherein each RB of an RBG is allocated to a different UE of the plurality of UEs.

19. The method of claim 16, further comprising transmitting, to the UE, one or more radio resource control (RRC) messages that indicate the allocation of frequency resources for the GC-DMRS.

20. The method of claim 19, wherein the frequency resources for the GC-DMRS are allocated according to a different pattern than frequency resources for another GC-DMRS associated with another plurality of UEs.

21. The method of claim 19, wherein the frequency resources for the GC-DMRS are allocated according to a fixed pattern for multiple DMRSs.

22. The method of claim 19, wherein the one or more RRC messages indicate an interlace value and an offset associated with the UE, wherein the offset represents a resource block (RB) offset relative to a beginning of a resource block group (RBG) for a RB allocated to the UE, and wherein the interlace value represents a number of RBs between successive RBs allocated to the UE.

23. The method of claim 22, wherein transmitting the FDRA for the PDSCH comprises transmitting, to the UE, a physical downlink control channel (PDCCH) that includes a downlink control information (DCI) message that indicates the FDRA for the PDSCH, and wherein the FDRA for the PDSCH indicates one or more RBGs that include RBs allocated to the UE.

24. An apparatus configured for wireless communication, the apparatus comprising:
   at least one processor; and
   a memory coupled to the at least one processor, wherein the at least one processor is configured to:
      determine an allocation of frequency resources for a group common demodulation reference signal (GC-DMRS) associated with a plurality of user equipments (UEs);
      initiate transmission, to a UE of the plurality of UEs, of a frequency domain resource allocation (FDRA) for a physical downlink shared channel (PDSCH) scheduled for transmission to the UE, the FDRA associated with a pattern indicating resources allocated to each of the UEs of the plurality of UEs associated with the GC-DMRS; and
      initiate transmission, to the UE, of the GC-DMRS and the PDSCH.

25. The apparatus of claim 24, wherein the at least one processor is further configured to:
   initiate transmission, to the UE, of a piggyback downlink control information (DCI) message in the PDSCH, the piggyback DCI message indicating the allocation of frequency resources for the GC-DMRS; and
   initiate transmission, to the UE, of one or more radio resource control (RRC) messages that indicate a length of the piggyback DCI message, a code rate scaling factor associated with the piggyback DCI message, or a combination thereof.

26. The apparatus of claim 25, wherein the one or more RRC messages further indicate an interlace value and an offset associated with the UE, wherein the offset represents a resource block (RB) offset relative to a beginning of a resource block group (RBG) for a RB allocated to the UE, wherein the interlace value represents a number of RBs between successive RBs allocated to the UE, and wherein transmitting the FDRA for the PDSCH comprises transmitting, to the UE, a physical downlink control channel (PDCCH) that includes a downlink control information (DCI) message that indicates the FDRA for the PDSCH.

27. The apparatus of claim 24, wherein the at least one processor is further configured to initiate transmission, to the plurality of UEs, of a group common physical downlink control channel (GC-PDCCH) that includes a downlink control information (DCI) message that indicates a FDRA for a group common PDSCH (GC-PDSCH) for the plurality of UEs and a FDRA for a piggyback downlink control information (DCI) message to be included in the GC-PDSCH.

28. The apparatus of claim 27, wherein the at least one processor is further configured to initiate transmission, to the UE, of a group identifier associated with the plurality of UEs.

29. The apparatus of claim 27, wherein transmitting the FDRA for the PDSCH comprises transmitting, to the UE, the piggyback DCI message in the GC-PDSCH, the piggyback DCI message indicating a respective FDRA for a respective PDSCH associated with each UE of the plurality of UEs.

30. The apparatus of claim 29, wherein piggyback DCI message includes a plurality of sub-headers associated with the plurality of UEs, wherein a sub-header of the plurality of sub-headers associated with the UE includes a user identifier associated with the UE, wherein the sub-header indicates the FDRA for the PDSCH and a modulation and coding scheme (MCS) associated with the PDSCH, and wherein the at least one processor is further configured to initiate transmission, to the UE, of one or more radio resource control (RRC) messages that indicate a length of each sub-header of the plurality of sub-headers, a code rate scaling factor associated with the piggyback DCI message, or a combination thereof.

* * * * *